(12) United States Patent
Morozov

(10) Patent No.: US 10,424,284 B2
(45) Date of Patent: Sep. 24, 2019

(54) LOW-FREQUENCY BROADBAND SOUND SOURCE FOR UNDERWATER NAVIGATION AND COMMUNICATION

(71) Applicant: Teledyne Instruments, Inc., Thousand Oaks, CA (US)

(72) Inventor: Andrey K. Morozov, N. Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 15/952,334

(22) Filed: Apr. 13, 2018

(65) Prior Publication Data

US 2019/0057680 A1  Feb. 21, 2019

Related U.S. Application Data

(60) Provisional application No. 62/485,177, filed on Apr. 13, 2017.

(51) Int. Cl.
*G10K 9/08* (2006.01)
*G01V 1/137* (2006.01)
(Continued)

(52) U.S. Cl.
CPC .............. *G10K 9/08* (2013.01); *B06B 1/20* (2013.01); *G01V 1/02* (2013.01); *G01V 1/133* (2013.01);
(Continued)

(58) Field of Classification Search
CPC ........ G10K 9/08; G10K 11/172; G01V 1/133; G01V 1/137
See application file for complete search history.

(56) References Cited

U.S. PATENT DOCUMENTS 3,986,669 A * 10/1976 Martner .............. B05B 17/0607
239/102.2
4,359,962 A * 11/1982 Olsson ..................... G10K 9/04
116/137 R
(Continued)

OTHER PUBLICATIONS

Morozov et al., "A Sound Projector for Acoustic Tomography and Global Ocean Monitoring", IEEE Journal of Oceanic Engineering, vol. 28, No. 2, Apr. 2003, pp. 174-185.
(Continued)

*Primary Examiner* — Ian J Lobo
(74) *Attorney, Agent, or Firm* — K&L Gates LLP

(57) ABSTRACT

An underwater sound source includes an acoustical driver, a controller of the acoustical driver, and a resonant tube acoustically coupled to the acoustical driver. The resonant tube has a pair of slotted portions, in which each slotted portion is disposed along the length of the resonant tube at a location corresponding to a node of a harmonic of the resonant tube. The sound system is configured to emit an output signal within a bandwidth defined by a dual resonance characteristic of the resonator tube. The sound source may also include a pair of coaxial tubular sleeves disposed around the resonant tube, each sleeve configured to slidably cover one of the slotted portions, and tune the resonance frequency of the tube over a wide range. At a high frequency end, when slots are uncovered, the frequency response of the resonant tube obtains a dual-resonant form.

14 Claims, 16 Drawing Sheets

(51) Int. Cl.
*G01V 1/133* (2006.01)
*G10K 11/172* (2006.01)
*B06B 1/20* (2006.01)
*G01V 1/02* (2006.01)
*G10K 11/04* (2006.01)
*H04R 1/28* (2006.01)
*H04R 1/34* (2006.01)
*H04R 1/44* (2006.01)
*H04R 3/04* (2006.01)
*H04R 17/00* (2006.01)

(52) U.S. Cl.
CPC .............. *G01V 1/137* (2013.01); *G10K 11/04* (2013.01); *G10K 11/172* (2013.01); *H04R 1/2857* (2013.01); *H04R 1/345* (2013.01); *H04R 1/44* (2013.01); *H04R 3/04* (2013.01); *H04R 17/00* (2013.01); *Y02A 90/36* (2018.01)

(56) References Cited

U.S. PATENT DOCUMENTS

| | | |
|---|---|---|
| 4,855,964 A | 8/1989 | Fanning et al. |
| 8,400,872 B2 | 3/2013 | Gulgné et al. |
| 8,670,293 B2 | 3/2014 | Morozov |
| 2012/0243378 A1* | 9/2012 | Morozov ............... G01V 1/145 367/143 |
| 2013/0010573 A1* | 1/2013 | Morozov ............... G01V 1/135 367/142 |

OTHER PUBLICATIONS

Morozov et al., "High-efficient tunable sound sources for ocean and bottom tomography, 15 years of operating history", Oceans, IEEE, 2016, 10 pages.

Morozov et al., "Underwater tunable organ-pipe sound source", The Journal of the Acoustical Society of America, vol. 122, Issue 2, Aug. 2007, pp. 777-785.

* cited by examiner

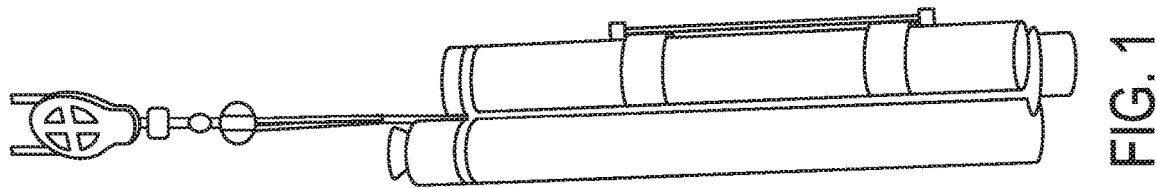

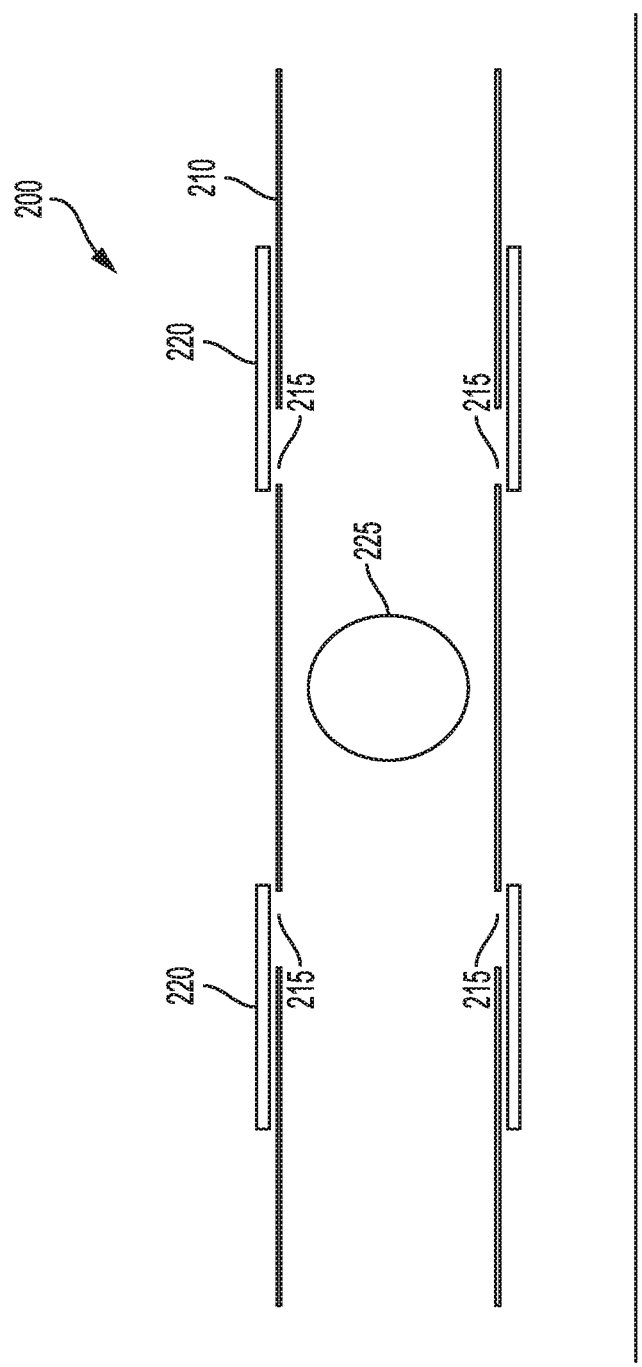

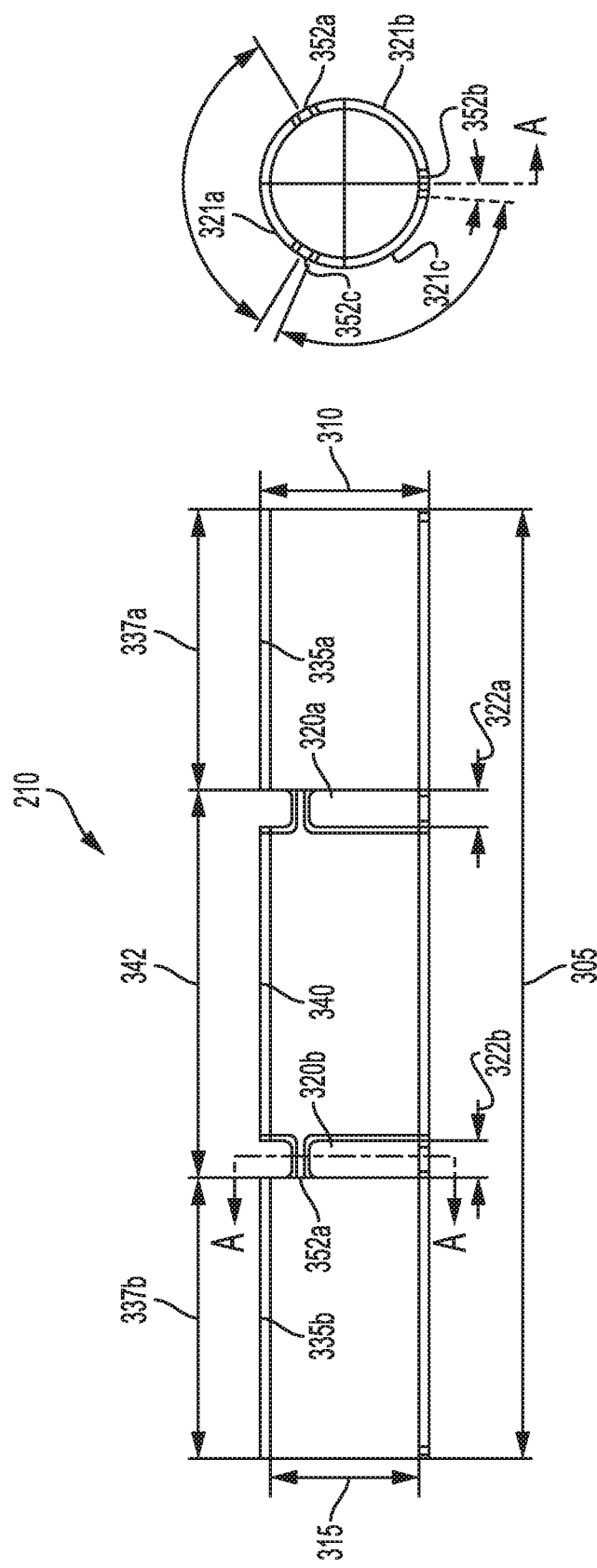

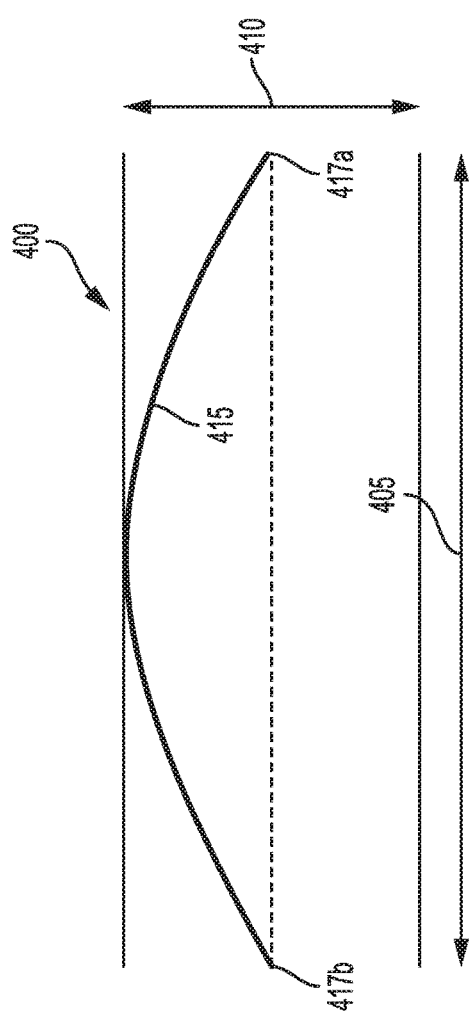
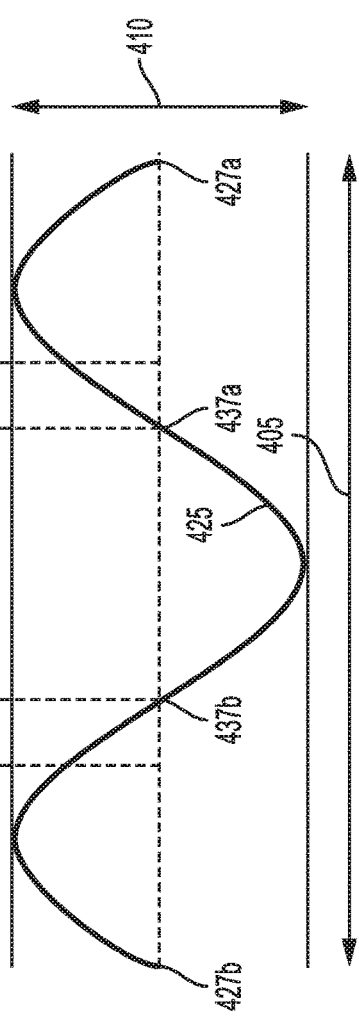
FIG. 4A
FIG. 4B

SECTION A-A

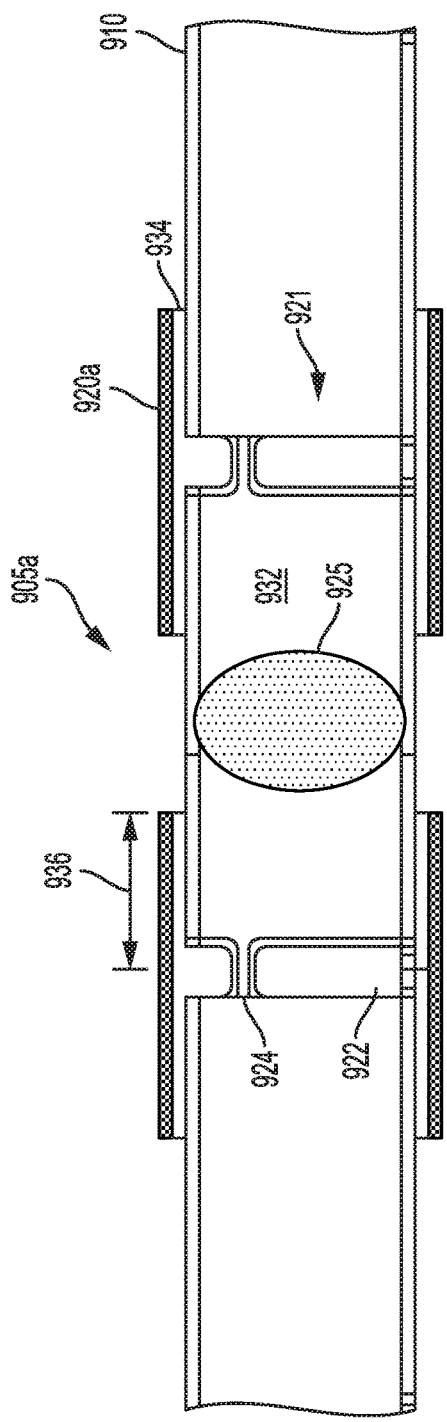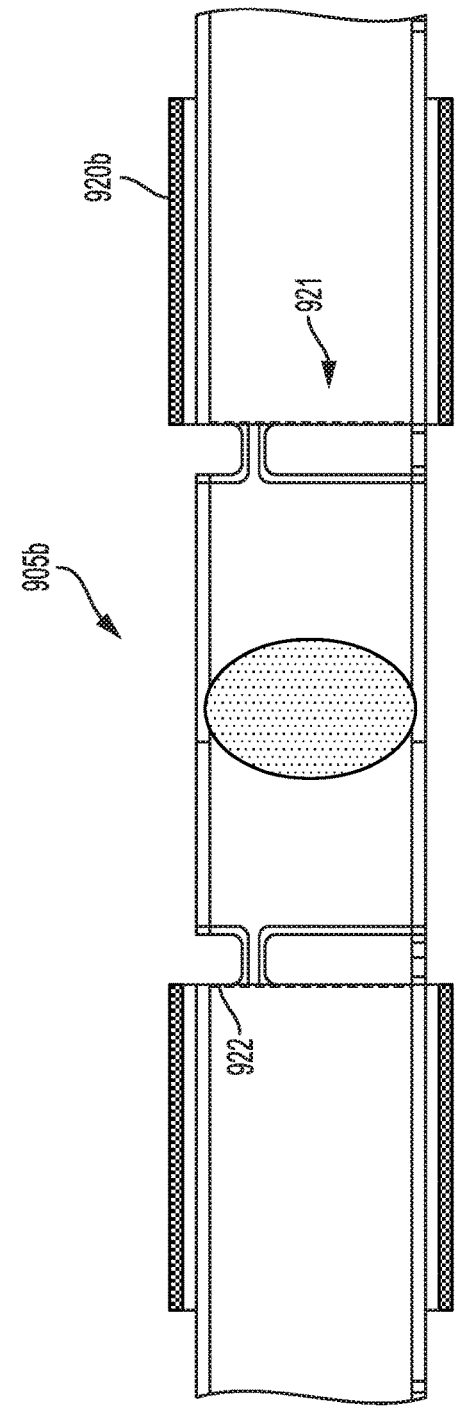

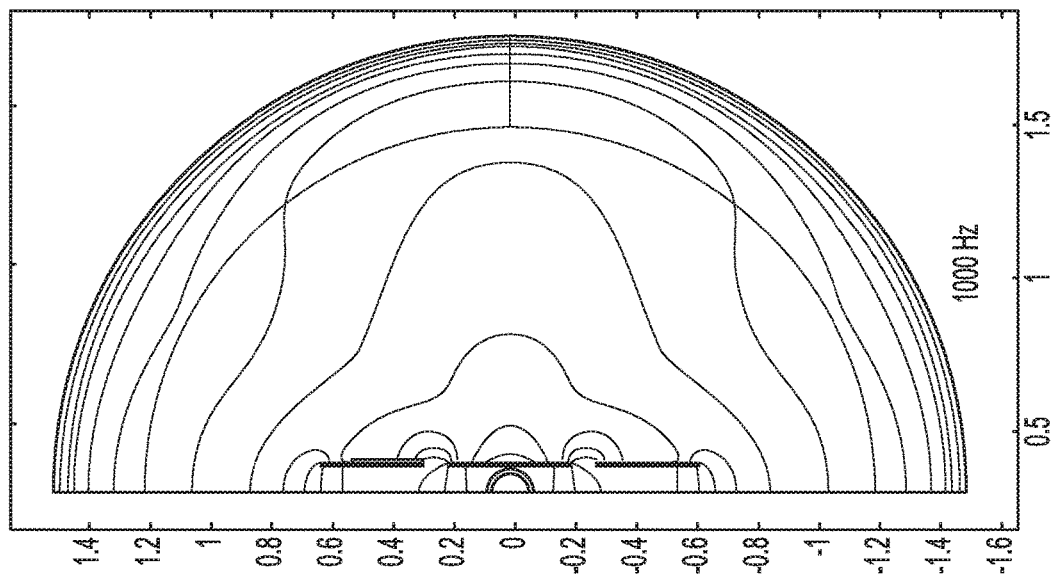
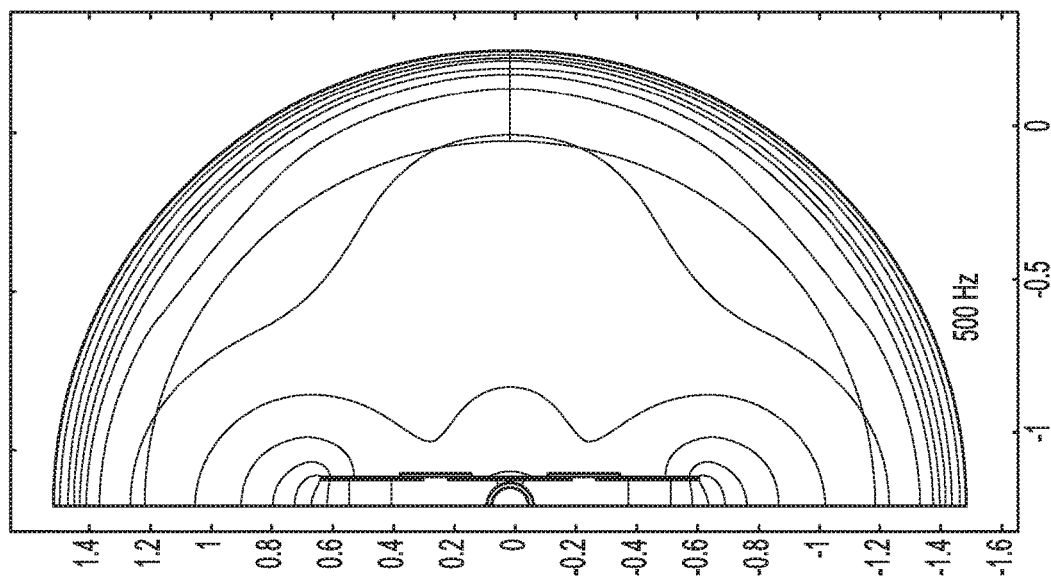

LOW-FREQUENCY BROADBAND SOUND SOURCE FOR UNDERWATER NAVIGATION AND COMMUNICATION

PRIORITY

This application claims the benefit of U.S. Provisional Patent Application Ser. No. 62/485,177, entitled LOW-FREQUENCY BROADBAND SOUND SOURCE FOR UNDERWATER NAVIGATION AND COMMUNICATION, filed Apr. 13, 2017, the disclosure of which is hereby incorporated by reference herein in its entirety and for all purposes.

STATEMENT OF GOVERNMENTAL INTEREST

This invention was made with U.S. Government support under subcontract number 14603 associated with contract number N66001-16-C-4003 awarded by the Defense Advanced Research Projects Agency (DARPA) of the U.S. Department of Defense in connection with the Positioning System for Deep Ocean Navigation (POSYDON), Precision Ocean Interrogation, Navigation, and Timing (POINT) project. The U.S. Government has certain rights in the invention.

BACKGROUND

This application is related to the disclosures of U.S. Pat. No. 8,670,293, entitled "BROADBAND SOUND SOURCE FOR LONG DISTANCE UNDERWATER SOUND PROPAGATION", U.S. Pat. No. 4,855,964, entitled "VENTED-PIPE PROJECTOR", and non-patent literature document entitled "High-efficient tunable sound sources for ocean and bottom tomography, 15 years of operating history", by Andrey K. Morozov et al., OCEANS 2016 MTS/IEEE Monterey, September 2016, the disclosures of which are hereby incorporated by reference herein in their entirety and for all purposes.

A first test of one aspect of a tunable underwater organ-pipe sound source had been successfully conducted on Nov. 9, 2001. The tunable sound source had many useful characteristics including its ability to operate at any depth underwater. In addition, its output was essentially free of unwanted high frequency harmonics. The acoustical driver of the sound source was tuned to match the frequency and phase of a reference frequency-modulated signal. Over time, this tunable underwater organ-pipe formed the basis for a variety of related devices. In some examples, related devices were designed to have a bandwidth of about 200-300 Hz. Some alternative devices were designed to sweep the frequency of their outputs in a linear manner. In some examples, the sweep range was from about 140 Hz to about 205 Hz. In some examples, the sweep range was from about 500 Hz to about 1000 Hz. In some other examples, the sweep range was from about 800 Hz to about 1200 Hz. In some examples, the sound source could sweep the range of frequencies in about one second. In one example, a sound source was configured to sweep a range of output frequencies in a few minutes. In one example, a tunable sound source configured to sweep its output range in a linear fashion over 135 seconds was employed to make ocean acoustic tomography measurements. In another example, a tunable sound source was configured to emit 80 second narrow-band chirps.

In another example, a tunable underwater sound source has been bottom-deployed in a swept frequency array to produce high-resolution seismic imaging of deep underwater geological formations. Such imaging may be obtained by the use of beam-formed and beam-steered seismic signals to produce high-resolution imaging of geological structures.

SUMMARY

In one aspect, an underwater sound source may include an acoustical driver, a controller of the acoustical driver, and a resonator tube acoustically coupled to the acoustical driver. The resonator tube may further include a first slotted portion including a first at least two co-radial resonator slots, and a second slotted portion including a second at least two co-radial resonator slots. A total length of the resonator tube may define a plurality of harmonics of the resonator tube. The first slotted portion may be located at a first position along the total length of the resonator tube corresponding to a first node of one of the plurality of harmonics, and the second slotted portion is located at a second position along the total length of the resonator tube corresponding to a second node of one of the plurality of harmonics. The controller of the acoustical driver may be configured an output signal of the underwater sound source to within a bandwidth defined by a frequency response of the resonator tube.

In one aspect of the underwater sound source, the resonator tube has an outer diameter within a range of one tenth of the total length of the resonator tube to one half of the total length of the resonator tube.

In one aspect of the underwater sound source, each of the first at least two co-radial resonator slots of the first slotted portion has a width within a range of one tenth of a radius of the resonator tube and one half of the radius of the resonator tube, and each of the second at least two co-radial resonator slots of the second slotted portion has a width within a range of one tenth of the radius of the resonator tube and one half of the radius of the resonator tube.

In one aspect of the underwater sound source, the first slotted portion and the second slotted portion define a medial section of the resonator tube therebetween, the first slotted portion and a first end of the resonator tube define a first terminal section of the resonator tube therebetween, and the second slotted portion and a second end of the resonator tube define a second terminal section of the resonator tube therebetween.

In one aspect of the underwater sound source, the first terminal section has a first section length, the second terminal section has a second section length, and the medial section has a medial section length. The medial section length may differ from the first section length and the medial section length may differ from the second length.

In one aspect of the underwater sound source, the first of the at least two co-radial resonator slots of the first slotted portion are separated by a first bridge connecting a first end of the medial section and a first end of the first terminal section, and the second of the at least two co-radial resonator slots of the second slotted portion are separated by a second bridge connecting a second end of the medial section and a first end of the second terminal section.

In one aspect of the underwater sound source, the frequency response of the resonator tube includes a dual resonance transfer function defined by a first resonance frequency and a second resonance frequency, and the bandwidth is between 10% and 15% of a medial frequency.

In an aspect, an underwater sound source may include an acoustical driver, a controller of the acoustical driver, a resonator tube acoustically coupled to the acoustical driver, a first coaxial tubular sleeve, and a second coaxial tubular sleeve. The resonator tube may further include a first slotted portion comprising a first at least two co-radial resonator slots; and a second slotted portion comprising a second at least two co-radial resonator slots. A total length of the resonator tube may define a plurality of harmonics of the resonator tube. The first slotted portion may be located at a position along the total length of the resonator tube corresponding to a first node of one of the plurality of harmonics, and the second slotted portion is located at a position along the total length of the resonator tube corresponding to a second node of one of the plurality of harmonics. The resonator tube may be disposed within the first coaxial tubular sleeve thereby forming a first gap between a first portion of an exterior surface of the resonator tube and an interior surface of the first coaxial tubular sleeve, and the resonator tube may be disposed within the second coaxial tubular sleeve thereby forming a second gap between a second portion of the exterior surface of the resonator tube and an interior surface of the second coaxial tubular sleeve. The first coaxial tubular sleeve may be configured to slide upon the first portion of the exterior surface of the resonator tube and the second coaxial tubular sleeve may be configured to slide upon the second portion of the exterior surface of the resonator tube. The underwater sound source may be configured to operate in a first acoustic mode when the first slotted portion is covered by the first coaxial tubular sleeve and the second slotted portion is covered by the second coaxial tubular sleeve, and the underwater sound source may be configured to operate in a second acoustic mode when the first slotted portion is uncovered by the first coaxial tubular sleeve and the second slotted portion is uncovered by the second coaxial tubular sleeve.

In one aspect of the underwater sound source, the first gap has a width in a range between 1 mm and 5 mm, and the second gap has a width in a range between 1 mm and 5 mm.

In one aspect of the underwater sound source, wherein the controller of the acoustical driver is configured to control an output frequency of the acoustical driver to a tube resonance frequency determined at least in part by a location of the first coaxial tubular sleeve and a location of the second coaxial tubular sleeve when the underwater sound source is configured to operate in the first acoustic mode.

In one aspect of the underwater sound source, the controller of the acoustical driver is configured to control an output signal of the underwater sound source to within a bandwidth defined by a frequency response of the resonator tube.

In an aspect, an underwater sound system, may include an underwater sound source, a transmission comprising a lead screw, a motor in mechanical communication with the transmission and configured to impart a rotary motion to the lead screw, and
a water pressure housing, wherein an exterior surface of the water pressure housing is in mechanical communication with the transmission and the motor, and wherein an interior of the water pressure housing is configured to contain one or more electrical components configured to control and power the motor. The underwater sound source may include an acoustical driver, a controller of the acoustical driver, a resonator tube acoustically coupled to the acoustical driver, a first coaxial tubular sleeve, and a second coaxial tubular sleeve. The resonator tube may further include a first slotted portion comprising a first at least two co-radial resonator slots; and a second slotted portion comprising a second at least two co-radial resonator slots. A total length of the resonator tube may define a plurality of harmonics of the resonator tube. The first slotted portion may be located at a position along the total length of the resonator tube corresponding to a first node of one of the plurality of harmonics, and the second slotted portion is located at a position along the total length of the resonator tube corresponding to a second node of one of the plurality of harmonics. The resonator tube may be disposed within the first coaxial tubular sleeve thereby forming a first gap between a first portion of an exterior surface of the resonator tube and an interior surface of the first coaxial tubular sleeve, and the resonator tube may be disposed within the second coaxial tubular sleeve thereby forming a second gap between a second portion of the exterior surface of the resonator tube and an interior surface of the second coaxial tubular sleeve. The first coaxial tubular sleeve may be configured to slide upon the first portion of the exterior surface of the resonator tube and the second coaxial tubular sleeve may be configured to slide upon the second portion of the exterior surface of the resonator tube. The underwater sound source may be configured to operate in a first acoustic mode when the first slotted portion is covered by the first coaxial tubular sleeve and the second slotted portion is covered by the second coaxial tubular sleeve, and the underwater sound source may be configured to operate in a second acoustic mode when the first slotted portion is uncovered by the first coaxial tubular sleeve and the second slotted portion is uncovered by the second coaxial tubular sleeve. The lead screw may be in mechanical communication with the first coaxial tubular sleeve and the second coaxial tubular sleeve. The rotary motion imparted to the lead screw may result in a motion of imparted to the first coaxial tubular sleeve and the second coaxial tubular sleeve.

In one aspect of the underwater sound system, the lead screw is configured to move the first coaxial tubular sleeve and the second coaxial tubular sleeve symmetrically in opposing directions when the lead screw is rotated by the motor.

In one aspect of the underwater sound system, the transmission is covered with one or more oil-filled bellows configured to prevent water from contacting the transmission.

In an aspect, a method of transmitting signals underwater may include providing an underwater sound source, including an acoustical driver, a controller of the acoustical driver, and a resonator tube acoustically coupled to the acoustical driver, and controlling, by the controller, an output signal of the underwater sound source to within a bandwidth defined by a a frequency response of the resonator tube. The resonator tube may include a first slotted portion comprising a first at least two co-radial resonator slots, and a second slotted portion comprising a second at least two co-radial resonator slots. A total length of the resonator tube may define a plurality of harmonics of the resonator tube. The first slotted portion may be located at a first position along the total length of the resonator tube corresponding to a first node of one of the plurality of harmonics, and the second slotted portion may be located at a second position along the total length of the resonator tube corresponding to a second node of one of the plurality of harmonics.

FIGURES

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 1 depicts a submersible organ pipe sound source being retrieved after being deployed on the sea bed for three years, according to an aspect of the present disclosure.

FIG. 2 is a schematic of a tunable resonant source, according to another aspect of the present disclosure.

FIG. 3A depicts a longitudinal cross-sectional view of a dual resonant sound source according to another aspect of the present disclosure.

FIG. 3B depicts a cross-sectional view at A-A of the dual resonant sound source depicted in FIG. 3A.

FIGS. 4A and 4B depict a first resonance mode and a second resonance mode, respectively, of a sound wave within a tunable resonant source, according to another aspect of the present disclosure.

FIG. 9A schematically depicts the disposition of the adjustable coaxial tubular sleeves with respect to the resonator slots in a completely closed configuration, according to an aspect of the present disclosure.

FIG. 9B schematically depicts the disposition of the adjustable coaxial tubular sleeves with respect to the resonator slots in a partially open configuration, according to an aspect of the present disclosure.

Figure 6:
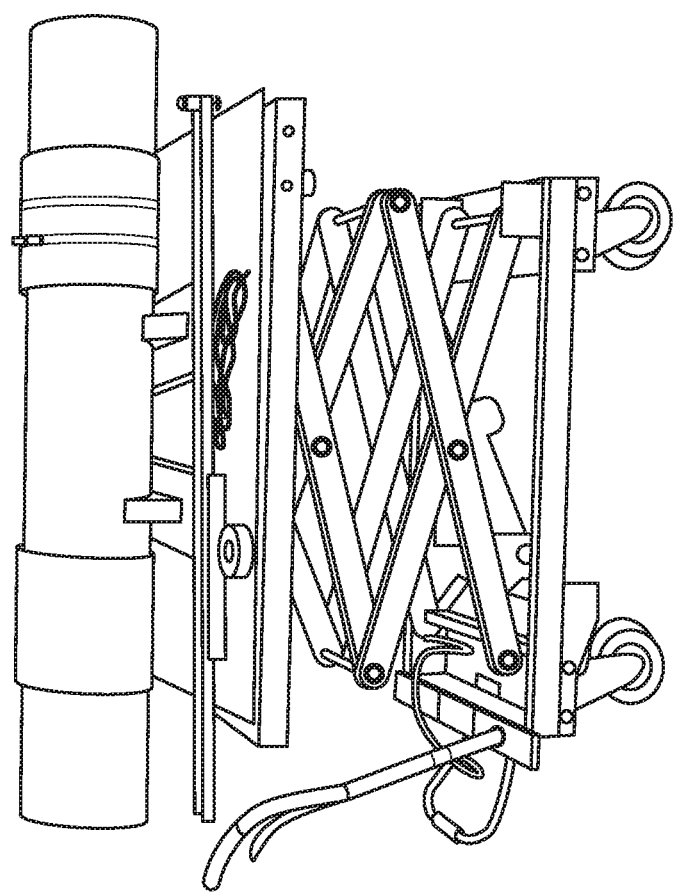
FIG. 6 depicts a realized tunable resonant sound source as depicted in FIG. 2 include coaxial tubular sleeves depicted in FIGS. 5A-C according to an aspect of the present disclosure.
Figure 10:
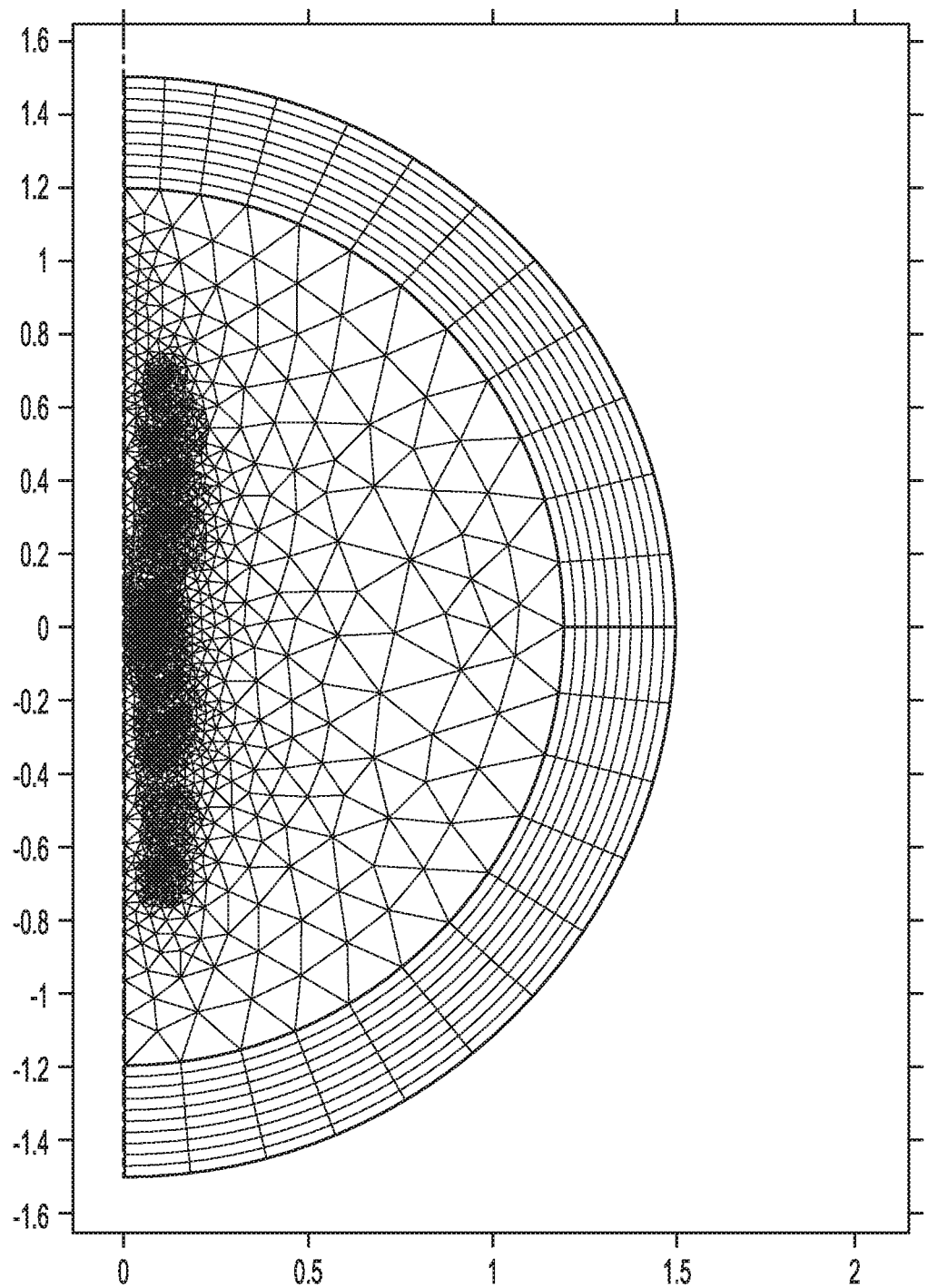

FIG. 10 schematically depicts the mesh structure used for a finite element analysis of the tunable resonant sound source depicted in FIG. 6, according to an aspect of the present disclosure.

FIGS. 11A and B graphically depict a finite element analysis simulation in an axisymmetric approximation of sound pressure levels of the tunable resonant sound source depicted in FIG. 6 operating at 500 Hz and at 1000 Hz, respectively, according to an aspect of the present disclosure.

Figure 12:
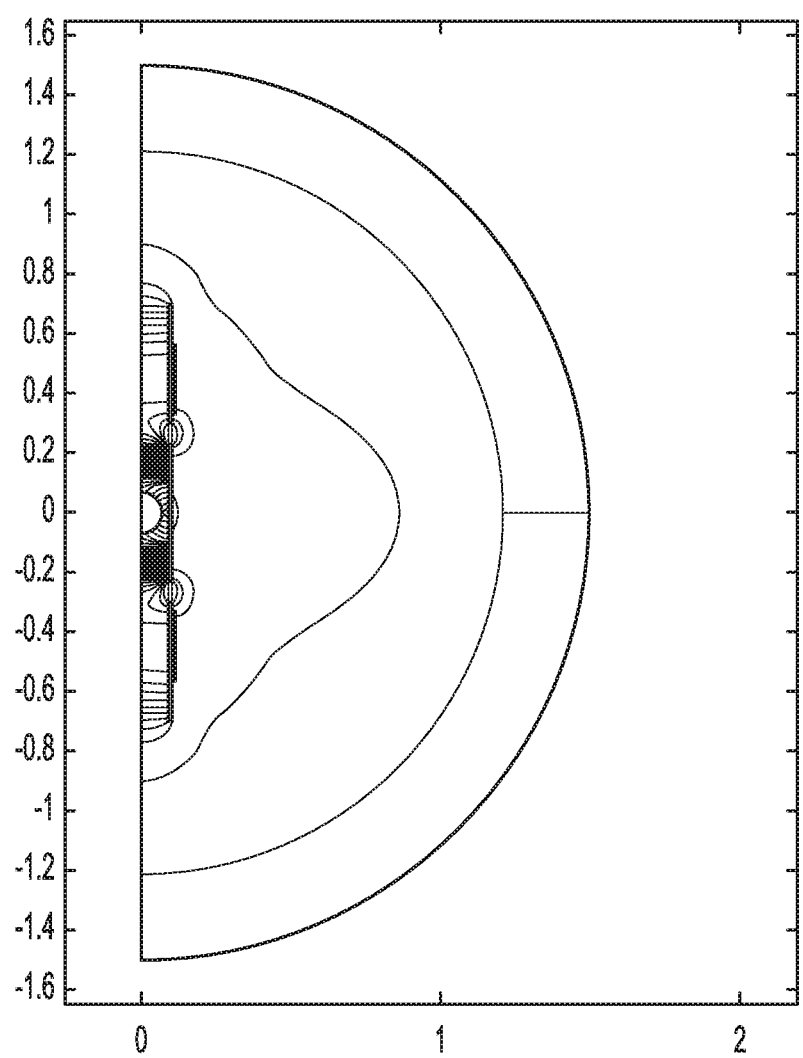

FIG. 12 graphically depicts a finite element analysis simulation of sound pressure levels of the tunable resonant sound source depicted in FIG. 6 having the resonator slots completely uncovered by the adjustable coaxial tubular sleeve, respectively, according to an aspect of the present disclosure.

Figure 13:
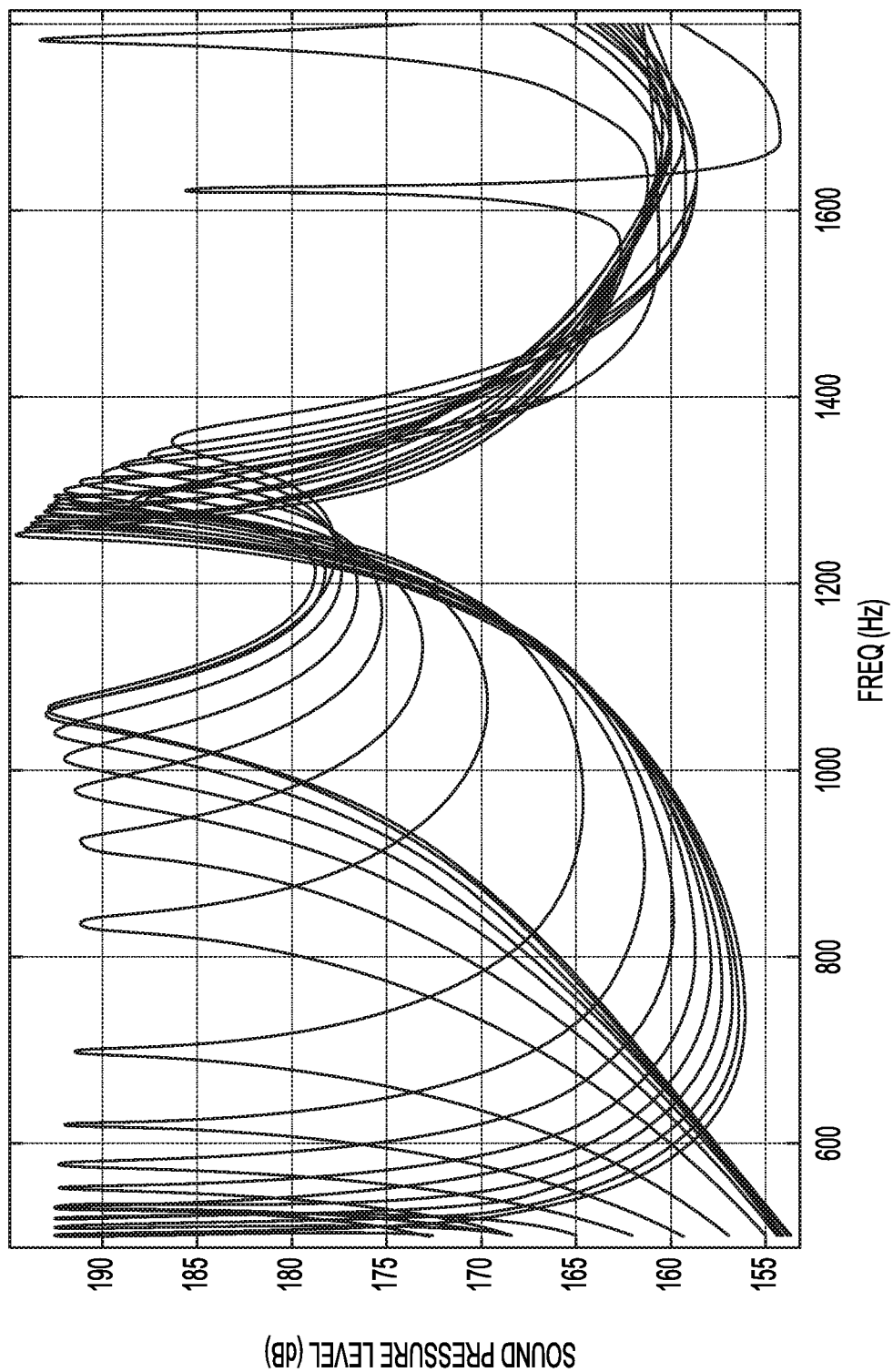

FIG. 13 graphically depicts sound pressure level versus frequency graphs according to a finite element analysis simulation of a sound source depicted in FIG. 6 as the adjustable coaxial tubular sleeves move with respect to the resonator slots, according to an aspect of the present disclosure.

FIGS. 14A-J graphically depict sound pressure levels versus frequency graphs as measured from a sound source depicted in FIG. 6 as the adjustable coaxial tubular sleeves move with respect to the resonator slots, according to an aspect of the present disclosure.

Figure 15A:
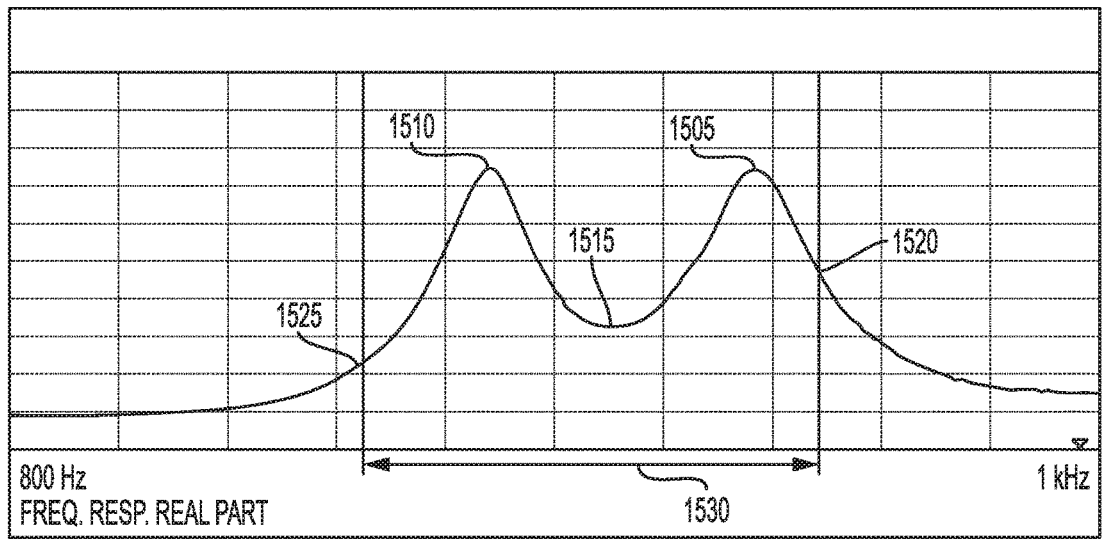

FIGS. 15A, B graphically depict the real and imaginary components, respectively, of a measurement of the admittance of a sound source depicted in FIG. 6 when the adjustable coaxial tubular sleeves have moved to completely uncover the resonator slots, according to an aspect of the present disclosure.

DESCRIPTION

Over 15 years of operating history, tunable underwater transducers have demonstration exceptional performance. However, the tunable transducers have limitations, when used for arbitrary waveforms. They can only transmit frequency-modulated signals. Examples of such frequency-modulated signals may include chirp signals and linearly-swept signals. A doubly-resonant organ pipe provides transmission of arbitrary waveforms over a much wider frequency band. As with the single-resonance pipes, the sources can be used at all depths and are efficient and very light if built from composites. The doubly-resonant organ pipes comprise an inner resonator tube with thin walls tuned to a certain frequency surrounded by a larger-diameter tube (Morozov 2014, U.S. Pat. No. 8,670,293). The doubly-resonant free flooded pipes may have good performance, but their bandwidth may be much smaller than the range of frequencies covered by tunable frequency sweeping projectors. For example one aspect of such a transducer had a bandwidth of only about 34 Hz around a 500 Hz central frequency. Such a narrow bandwidth can be compared to a 500 Hz bandwidth (between about 500 Hz and about 1000 Hz) which had been practically achieved by a tunable organ pipe transducer built from pipes having the same diameter and using the same spherical acoustical driver.

As disclosed above, such tunable frequency sound sources may be configured to emit sound over a range of about 140 Hz to about 205 Hz, about 20 Hz to about 300 Hz, about 500 Hz to about 1000 Hz, and about 800 Hz to about 1200 Hz. Thus, a tunable frequency sound source may be configured to emit sound within a range of about 140 Hz to about 1200 Hz. In some non-limiting examples, a tunable frequency sound source may be configured to emit sound at a frequency of about 140 Hz, about 160 Hz, about 180 Hz, about 200 Hz, about 205 Hz, about 220 Hz, about 240 Hz, about 260 Hz, about 280 Hz, about 300 Hz, about 400 Hz, about 500 Hz, about 600 Hz, about 800 Hz, about 900 Hz, about 1000 Hz, about 1100 Hz, about 1200 Hz, and any value or range of values therebetween, including end points.

It may be recognized that a system composed of a wideband tunable resonator may be useful to provide high precision oceanographic tomographic measurements and navigation. As disclosed above, a local dual-resonance system can be used to produce arbitrary signal transmissions. It may therefore be recognized that such arbitrary acoustic signals may be used as basis for underwater digital communication. It may be understood that for underwater navigation, it may be necessary to have a tunable resonant system for determining local positioning and a broadband dual-resonant system for transmitting parameters necessary to improve precision of the position estimation.

It may therefore be recognized that a hybrid underwater sound source that (1) can cover a large frequency band for determining precise acoustic ocean tomography and (2) have the capability to produce arbitrary signals for communication purposes, would be a desirable multipurpose device. The sum effect of the hybrid system may include a combination of high precision navigation and ocean tomography functions and supporting digital communications. The combination of the two functions may permit a single device to determine navigational and tomographic information and transmit additional data about navigation beacon positions and identities, and predictions related to variability of ocean characteristics. Such a system may have analogous functions to a satellite GPS system which provides both position via time delay calculations and additional information regarding the broadcasting satellite. The combined functionality may dramatically increase the precision of underwater navigation.

In some aspects, the traditional tunable organ-pipe sound source (see FIG. 1) transmits a frequency sweep signal by mechanical tuning a resonator tube (or organ pipe) to match the frequency and phase of a reference signal. FIG. 2 depicts schematically an aspect of the tunable organ-pipe sound source 200. The organ-pipe sound source 200 comprises a resonator tube 210 which acts as a simple, efficient, narrow-band, medium-output projector that operates at any ocean depth. The resonator tube 210 has resonator slots 215 (or vents), that are progressively covered or uncovered by symmetrically sliding coaxial tubular sleeves 220. The resonator tube 210 is disposed within each of the coaxial tubular sleeves 220. The output frequency of the tunable organ-pipe sound source 200 varies with the sleeve position. A computer-controlled electromechanical actuator moves the cylindrical sleeves 220 along the resonator tube 210. In addition, the voltage and/or current driving the acoustic driver 225 may be adjusted by means of a control device (for example, a phase-locked loop) so that the acoustic driver 225 may emit sound at the resonance frequency determined by the position of the cylindrical sleeves 220. In this manner, the organ-pipe sound source 200 may be kept in resonance at the instantaneous frequency over the range of swept frequency signals by adjusting the input voltage of the acoustic driver 225 to maintain the resonance of the output.

The sound of the organ-pipe sound source 200 may be driven by a volume velocity acoustic driver 225. In some examples, the acoustic driver 225 may be a piezo-ceramic sphere 2. In other examples, the acoustic driver 225 may be a tonpilz piezo driver. A computer may synthesize a frequency-modulated signal to drive the acoustic driver 225 through one or more components of a drive controller. In some examples, the drive controller may compare a phase between an output signal from a hydrophone in the resonant tube to the signal on the input of the acoustic driver 225. In some examples, the drive controller may use a phase-lock loop (PLL) system to keep the resonator tube 210 frequency the same as that of the drive signal. In some examples, the estimated PLL precision is better than 3 degrees of phase error. The use of a PLL system may maintain a small amount of error during a high rate of frequency change of the organ pipe sound source 200 output with a constant Q-factor over the working frequency band.

FIGS. 3A,B illustrate engineering drawings of the resonator tube 210 that may be used in a dual frequency sound system. In some aspects, the resonator tube 210 may be made of a metal, for example aluminum. The resonator tube 210 may be defined by an overall length 305 from a first end to a second end. The resonator tube 210 may also be defined by an outer diameter 310 and an inner diameter 315. The resonator tube 210 may also include one or more slotted portions 320a,b disposed along the overall length 305 of the resonator tube 210, each slotted portion 320a,b comprising one or more resonator slots. In some aspects, the resonator slots of a slotted portion may all be co-radial. The resonator slots may be defined by a width 322a,b. The slotted portions 320a,b may divide the resonator tube 210 into multiple sections. FIG. 3A depicts an example in which two slotted portions 320a,b are illustrated. The slotted portions may divide the resonator tube 210 into a medial portion 340, and two terminal portions 335a,b. The medial portion 340 may be defined on either side by one of the slotted portions 320a,b. A first terminal portion 335a may be defined by a first slotted portion 320a on one side and a first end of the resonator tube 210. A second terminal portion 335b may be defined by a second slotted portion 320a on one side and a second end of the resonator tube 210. The medial portion 340 may be defined by a medial portion length 342, and each of the two terminal portions 335a,b may be defined by a terminal portion length 337a,b, respectively.

FIG. 3B illustrates a cross sectional view of the resonator tube 210 of FIG. 3A through second slotted portion 320b at line A-A. FIG. 3B depicts three slots 321a-c that compose slotted portion 320b. Each of the resonator slots 321a-c has a slot width 322b. In some examples, the resonator slots 352a-c may be co-radial and may be disposed equally about the resonator tube 210 at the slotted portion 320b. Between the resonator slots may be bridges 352a-c. With reference to FIG. 3A, bridges 352a-c may connect the second terminal portion 335b with the medial portion 340 of the resonator tube 210. It may be recognized that a similar cross section through slotted portion 320a may depict multiple resonator slots separated by multiple bridges as depicted in FIG. 3B. Additionally, a similar cross section through slotted portion 320a may depict multiple bridges configured to connect the first terminal portion 335a with the medial portion 340.

In some examples, the resonator tube 210 may have an overall length 305 of about 52.5 in., an outer diameter 310 of about 8.94 in., and an inner diameter 315 of about 8.00 in. In such an example, the resonator tube 210 may have a thickness of about 0.47 in. Additionally, in some examples, each resonator slot of the slotted sections 320a,b (for example, resonator slots 321a-c of second slotted section 320b) may have a width 322a,b of about 2.0 in. The first terminal portion 335a of the resonator tube 210 may be defined by an outer edge of the first slotted portion 320a and may have a first terminal portion length 337a. Similarly, the second terminal portion 335b of the resonator tube 210 may be defined by an outer edge of the second slotted portion 320b and may have a second terminal portion length 337a. The medial portion 340 may be defined as the portion of the resonator tube 210 disposed between the first terminal portion 335a and the second terminal portion 335b. In some examples, the length 337a of the first terminal portion 335a may be the same as the length 337b of the second terminal portion 335b. In some alternative examples, the length 337a of the first terminal portion 335a may differ from the length 337b of the second terminal portion 335b.

In one example, the lengths 337a and 337b of the two terminal portions 335a and 335b, respectively, may be about 15.60 in. In one example, the length 342 of the medial portion 340 may be about 21.3 in. In some examples, the widths 322a,b of the resonator slots of the slotted portions may be about 2.0 in. It may also be recognized that the number of resonator slots in each slotted portion is not limited to three resonator slots, such as 352a-c as illustrated in FIG. 3B. For example, a slotted portion may have one resonator slot, two resonator slots, three resonator slots, four resonator slots, or any number of resonator slots that may result in the functions herein disclosed. Multiple resonator slots may be co-radial and disposed symmetrically about a longitudinal axis of the resonator tube 210 or they may be disposed asymmetrically about the longitudinal axis of the resonator tube 210. The length of each bridge, such as bridges 352a-c may be determined by the number, disposition, and length of the resonator slots (for example resonator slots 321a-c). For example, each bridge 352a-c may have the same width of about 1.5 in. It may be recognized that the multiple bridges within one slotted portion may all have the same width or they may have different widths. Additionally, the multiples bridges within a first slotted portion may have a thickness that is the same as or differs from a thickness of the multiple bridges within a second slotted portion.

It may be understood that the values for the dimensions disclosed above are merely examples, and as such are not intended to limit dimensions of alternative aspects of the resonator tube 210. For example, the outer diameter 310 of the resonator tube 210 may be determined by overall length 305 of the resonator tube 210. For example, the outer diameter 310 may range between a value of 0.20 times the overall length 305 of the resonator tube 210 to about 0.50 times the overall length 305 of the resonator tube 210. Non-limiting examples of the outer diameter 310 of the resonator tube may include about 0.20 times the overall length 305 of the resonator tube 210, about 0.25 times the overall length 305 of the resonator tube 210, about 0.30 times the overall length 305 of the resonator tube 210, about 0.35 times the overall length 305 of the resonator tube 210, about 0.40 times the overall length 305 of the resonator tube 210, about 0.45 times the overall length 305 of the resonator tube 210, about 0.50 times the overall length 305 of the resonator tube 210, or any value or range of values therebetween including endpoints.

In another example, the widths 322a,b of the resonator slots may be determined by a radius of the resonator tube 210. For example, the widths 322a,b of the resonator slots may range between a value of 0.10 times the radius of the resonator tube 210 to about 0.50 times the radius of the resonator tube 210. Non-limiting examples of the widths 322a,b of the resonator slots may include about 0.10 times the radius of the resonator tube 210, about 0.15 times the radius of the resonator tube 210, about 0.20 times the radius of the resonator tube 210, about 0.25 times the radius of the resonator tube 210, about 0.30 times the radius of the resonator tube 210, about 0.35 times the radius of the resonator tube 210, about 0.40 times the radius of the resonator tube 210, about 0.45 times the radius of the resonator tube 210, about 0.50 times the radius of the resonator tube 210, or any value or range of values therebetween including endpoints.

For example, as noted above, the lengths 337a,b of the terminal portions 335a,b may be the same or they may differ. In some alternative examples, the thickness of the medial portion 340 may be the same as the thickness of both of the terminal portions 335a,b. In some aspects, the terminal portions 335a,b may have the same thickness which may differ from the thickness of the medial portion 340. In yet some other aspects, the first terminal portion 335a may have a thickness that differs from the thickness of the second terminal portion 335b. In yet some additional aspects, each of the first terminal portion 335a, the medial portion 340, and the second terminal portion 335b may have a thickness that differs from the thickness of the other portions.

In consideration of the location of the slotted portions 320a,b, one may consider the natural harmonics of a tubular organ pipe having both ends open. FIGS. 4A and 4B illustrate a first acoustic mode and a second acoustic mode of an organ-pipe resonator 400, respectively. The organ-pipe resonator 400 may have a length 405 (denoted l) and a diameter 410 (denoted d). For a resonator tube 500 having dimensions 52.5 in. in length, and 8 in. in diameter, the first harmonic, $f_1$, may be about 500 Hz in seawater. Similarly, the second harmonic, $f_2$, may be three times $f_1$ or about 1500 Hz.

FIG. 4A depicts a first resonant waveform 415 corresponding to the first acoustic harmonic. It may be observed that the first resonant waveform 415 has two stable nodes 417a,b in which each of the stable nodes 417a,b is located at an end of the organ-pipe resonator 400. FIG. 4B depicts a second resonant waveform 425 corresponding to the second acoustic harmonic. It may be observed that the second resonant waveform 425 also has two stable nodes 427a,b in which each of the stable nodes 427a,b is located at an end of the organ-pipe resonator 400. Additionally, the second resonant waveform 425 has a second pair of stable nodes 437a,b that may be described as internal nodes. A first of the second pair of stable nodes 437a may be located at a distance of about ⅓ of the length 405 of the resonator 400 from a first end of the resonator. A second of the second pair of stable nodes 437b may be located at a distance of about ⅓ of the length 405 of the resonator tube 400 from a second end of the resonator.

Dotted lines 420a depict the location of the first slotted portion equivalent to 320a in FIG. 3A, and dotted lines 420b depict the location of the second slotted portion equivalent to 320b in FIG. 3A. It may therefore be understood that the slotted portions 320a,b may be positioned to correspond to the internal nodes 437a,b of the second harmonic $f_2$ of the organ-pipe resonator 400. In one example, an inner edge of the first slotted portion 320a may correspond to the location of the first internal stable node 437a. In another example, an inner edge of the second slotted portion 320b may correspond to the location of the second internal stable node 437b. Alternatively, an outer edge of the first slotted portion 320a may correspond to the location of the first internal stable node 437a and an outer edge of the second slotted portion 320b may correspond to the location of the second internal stable node 437b.

Figure 5A:
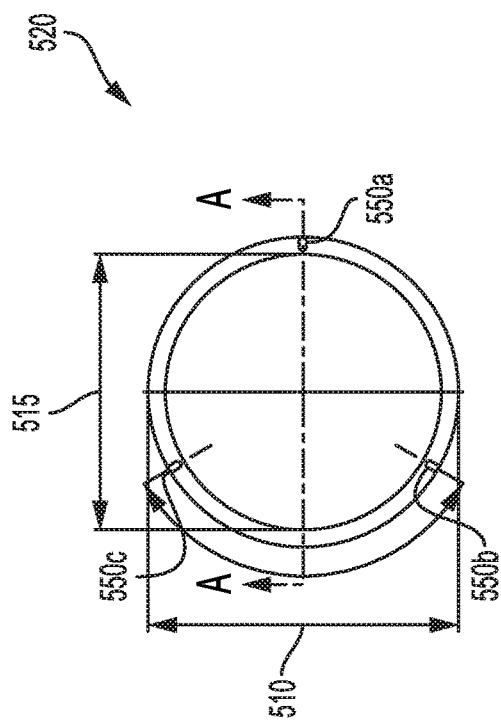
FIGS. 5A and 5B depict a radial cross-sectional view and a longitudinal cross-section view, respectively, of a coaxial tubular sleeve of a tunable resonant source according to another aspect of the present disclosure.
Figure 5B:
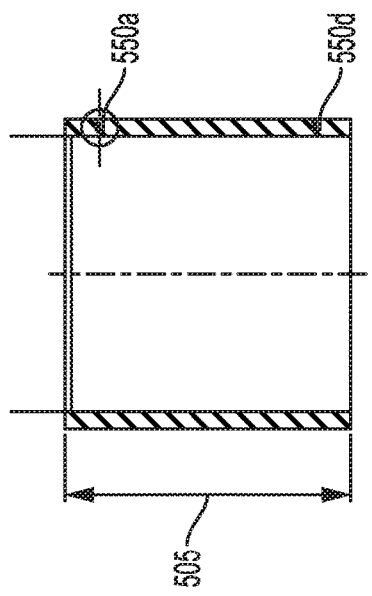

As disclosed above with respect to FIG. 2, the tunable organ-pipe sound source 200 may include the resonator tube 210 and multiple coaxial tubular sleeves 220. FIGS. 3A,B depict aspects of the resonator tube 210. FIGS. 5A,B depict aspects of a coaxial tubular sleeve 520. FIG. 5A depicts a radial cross-sectional view of one of a pair of coaxial tubular sleeves 520. Each coaxial tubular sleeve 520 may have an outer diameter 510, an inner diameter 515, and a length 505. The coaxial tubular sleeve 520 may also include one or more bolt-holes 550a-d. The bolt-holes 550a-d may be configured to receive bolts to affix one or more linear actuators to the coaxial tubular sleeves 520. Such linear actuators may be associated with one or more transmissions each transmission comprising a lead screw and a motor. In some aspects, the linear actuators may include a metal bar having a wheel at the end thereof. The wheel of each metal bar may be configured to turn on the outer surface of the resonator tube 210 while the coaxial tubular sleeves 520 are displaced along a longitudinal axis of the resonator tube 210. Without limitation, the coaxial tubular sleeves 520 may be dimensioned so that the resonator tube 210 may be located within the interior of the tubular sleeves 520.

In operation, the coaxial tubular sleeves 520 are configured to slide over the exterior surface of the resonator tube 210 by means of the one or more linear actuators. In some examples, the one or more linear actuators may be moved by a transmission comprising a lead screw. In some examples, the lead screw may be actuated by a motor powered by an electrical power source. Further, the motor may be controlled by one or more electronic controllers. Each coaxial tubular sleeve 520 is designed to cover or uncover one of the slotted portions 320a,b. It may be recognized that there may be as many coaxial tubular sleeves 520 as there are slotted portions 320a,b in a tunable organ-pipe sound source 200. In some examples, there may be two slotted portions 320a,b and coaxial tubular sleeves 520. In some other examples, there may be three slotted portions 320a,b and coaxial tubular sleeves 520. In some further examples, there may be four slotted portions 320a,b and coaxial tubular sleeves 520. In some aspects, there may be an even number of slotted portions 320a,b and coaxial tubular sleeves 520. In some examples, there may be an even number of slotted portions 320a,b and coaxial tubular sleeves 520 disposed symmetrically about the center of the resonator tube 210.

In some aspects, the coaxial tubular sleeves 520 may be independently actuated by one or more linear actuators. In some aspects, the coaxial tubular sleeves can be actuated by one linear actuator through a lead screw transmission and move in the opposite directions symmetrically from the center of the resonant tube. In some aspects, a first coaxial tubular sleeve 520 may be actuated to slide in a direction opposite to the direction of a second coaxial tubular sleeve 520. In some aspects, a first coaxial tubular sleeve 520 may be actuated to slide in a same direction as that of a second coaxial tubular sleeve 520. In some aspects, multiple coaxial tubular sleeves 520 may be actuated together by cooperating linear actuators. In some aspects, the coaxial tubular sleeves 520 may all be moved in a concerted manner so that they all move about the same distance.

In some examples, the coaxial tubular sleeves 520 may have a length 505 of about 9.25 in. In some examples, the coaxial tubular sleeves 520 may have an outer diameter 510 of about 10.0 in. In some examples, the coaxial tubular sleeves 520 may have an inner diameter 515 of about 8.976 in. In some examples, the inner diameter 515 may be about 9 in. In such examples, the coaxial tubular sleeves 520 may have a thickness of about 0.5 in. As disclosed above, in some examples of a tunable organ-pipe sound source 200, the outer diameter of the resonator tube 210 may be about 8.94 in. If the inner diameter 515 of the coaxial tubular sleeve 520 is about 8.976 in., there may be a gap of about 0.018 in. (about 0.45 mm) between the outer surface of the resonator tube 210 and the inner surface of the coaxial tubular sleeve 520. In some other examples, the gap may be about 1 mm. In still other examples, the gap may be about 1.5 mm. It may be recognized that the gap between the outer surface of the resonator tube 210 and the inner surface of the coaxial tubular sleeve 520 may have any value consistent with the function of the tunable organ-pipe sound source 200. In some examples, the value of the gap may be between about 0.4 mm and about 3.0 mm including, without limitation, a value of about 0.4 mm, about 0.45 mm, about 0.5 mm, about 0.6 mm, about 0.7 mm, about 0.8 mm. about 0.9 mm, about 1.0 mm, about 1.1, mm, about 1.2 mm, about 1.5 mm, about 1.75 mm, about 2.0 mm, about 2.5 mm, about 3.0 mm, or any value or range of values therebetween including endpoints. In some examples, the gap may have a dimension that ranges between about 1.0 mm and about 5.0 mm, including, without limitation, about 1.0 mm, about 1.5 mm, about 2.0 mm, about 2.5 mm. about 3.0 mm, about 3.5 mm, about 4.0, mm, about 4.5 mm, about 5.0 mm, or any value or range of values therebetween including endpoints.

It may be recognized that when a tunable organ-pipe sound source 200 is submersed in water, the water may fill at least a portion of the interior of the resonator tube 210. The water disposed within the at least portion of the interior of the resonator tube 210 may be in fluid communication with the free water exterior to the organ-pipe sound source 200 via the water in the slotted sections 320a,b and the water filling the gaps between the outer surface of the resonator tube 210 and the inner surface of the coaxial tubular sleeve 520.

FIG. 6 depicts a realization of a tunable organ-pipe sound source including the resonator tube and two coaxial tubular sleeves resting on a rolling jack stand.

Figure 7:
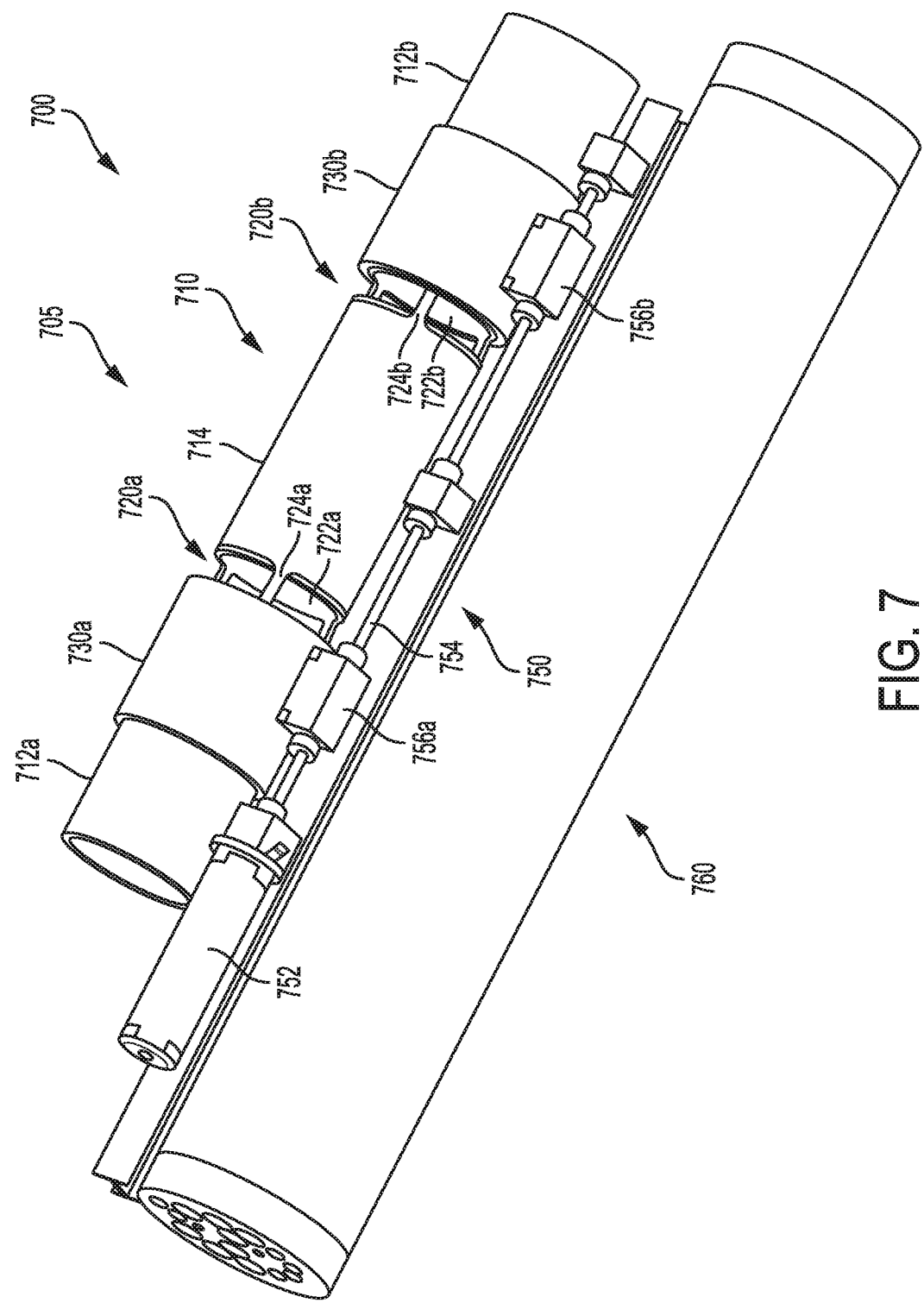
FIG. 7 depicts an engineering drawing of a tunable resonant sound system including the tunable resonant sound source depicted in FIG. 6 including a lead screw and transmission for adjusting the position of the adjustable coaxial tubular sleeves according to an aspect of the present disclosure.

FIG. 7 is a concept drawing of one aspect of an underwater sound system 700. The sound system may be composed of an organ-pipe sound source 705, a transmission assembly 750, and deep water pressure housing 760. The organ-pipe sound source 705 may include a resonator tube 710 disposed within a pair of coaxial tubular sleeves 730a,b. The resonator tube 710 may be divided by two slotted portions 720a,b into a first terminal portion 712a (bounded by a first end of the resonator tube 710 and a first edge of first slotted portion 720a), a second terminal portion 712b (bounded by a second end of the resonator tube 710 and a first edge of second slotted portion 720a), and a medial portion 714 (bounded by a second edge of the first slotted portion 720a and a second edge of the second slotted portion 720b). As an example, first slotted portion 720a is composed of one or more slots 722a and one or more bridges 724a. The one or more bridges 724a form end boundaries of the one or more resonator slots 722a and are configured to mechanically link the first terminal portion 712a with the medial portion 714. If the first slotted portion 720a is composed of more than one slot 722a, the multiple slots 722a may be co-radial. It may be recognized that second slotted portion 720b is composed of one or more resonator slots 722b and one or more bridges 724b. The one or more bridges 724b form end boundaries of the one or more resonator slots 722b and are configured to mechanically link the second terminal portion 712b with the medial portion 714. If the second slotted portion 720b is composed of more than one slot 722b, the multiple slots 722b may be co-radial. Each of the coaxial tubular sleeves 730a,b is configured to slide on the outer surface of the resonator tube 710 and to slidably occlude one of each of the slotted portions 720a,b.

The transmission assembly 750 may include a motor 752 configured to rotate a lead screw 754. Rotation of the lead screw 754 may cause a linear motion of the sleeve brackets 756a,b. The linear motion of sleeve bracket 756a may cause coaxial tubular sleeve 730a to slide along the outer surface of the resonator tube 710 and to cover or uncover slotted portion 720a. The linear motion of sleeve bracket 756b may cause coaxial tubular sleeve 730b to slide along the outer surface of the resonator tube 710 and to cover or uncover slotted portion 720b. In some aspects, the motions of sleeve brackets 756a,b may be coordinated and to move symmetrically in opposing directions. Although not shown in FIG. 7, the lead screw 754 or the transmission may be covered by one or more rubber bellows filled with oil to protect the lead screw 754 from corrosion when submerged under water.

Deep water pressure housing 760 may serve as a mechanical mounting structure for the transmission assembly 750 and or the organ-pipe sound source 705. The deep water pressure housing 760 may also house various components including a power supply for the motor 752, an electronic control assembly, a general purpose computer system, and a communication system. The electronic control assembly may include those electronic components configured to control the motion of the motor 752, including the direction of the motor rotation and the speed and acceleration of motor rotation. The general purpose computer system may include any one or more components which, without limitation, may include one or more processor or microprocessors, one or more memory components (including, without limitation, one or more static or dynamic memory components), and one or more interface components. The memory components may include instructions that, when executed by the processor or microprocessor, cause the processor or microprocessor to calculate parameters related to the operations of the underwater sound system 700. The instructions may also result in the processor or microprocessor directing the operations of the components of the underwater sound system 700, including, without limitation, directing the motor to adjust the positions of the coaxial tubular sleeves 730a,b via the control system and to adjust the output frequency of the a controllable acoustical driver. The interface components may also permit the one or more processors or microprocessors to transmit and/or receive data via the communication system.

Figure 8:
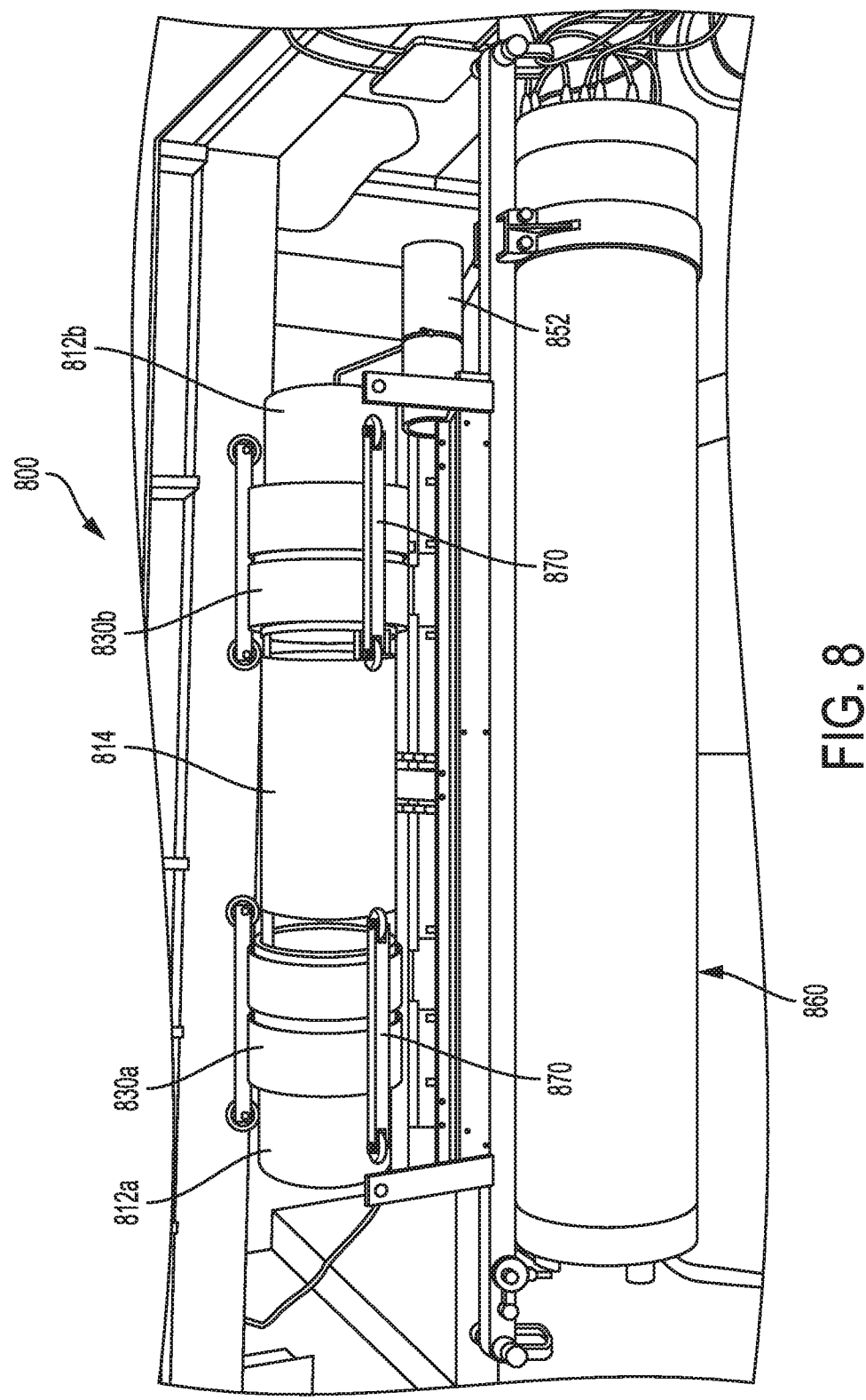
FIG. 8 depicts a realized tunable resonant sound system of the system depicted in FIG. 7, according to an aspect of the present disclosure.

FIG. 8 illustrates a realization of the underwater sound system 800 as depicted in FIG. 7. Components depicted in FIG. 8, are the deep water pressure housing 860, actuator motor 852, the medial portion 814 and two terminal portions 812a,b of the resonator tube and the coaxial tubular sleeves 830a,b. FIG. 8 also depicts wheeled stabilizer bars 870 that are mechanically associated with the coaxial tubular sleeves 830a,b. The stabilizer bars 870 may help stabilize the motion of the coaxial tubular sleeves 830a,b as the slide on the exterior surface of the resonator tube. In particular, they may prevent an edge of one of the coaxial tubular sleeves 830a,b from catching an edge of a resonator slot in the slotted portions.

FIG. 9A depicts an organ-pipe sound source in a first configuration 905a in which the coaxial tubular sleeves 920a completely cover the slotted portions 921. FIG. 9B depicts an organ-pipe sound source in a second configuration 905b in which the coaxial tubular sleeves 920b completely uncover the slotted portions 921. In the first configuration 905a, the coaxial tubular sleeves 920a completely cover the slotted portions 921. Upon activation, the driving oscillator 925 imparts an oscillating pressure force to water in the interior 932 of the resonator tube. The pressure force is primarily transmitted to the exterior of the resonator tube at the tube ends. However, some amount of the pressure force is transmitted to the exterior of the resonator tube via the resonator slots 922 and through the gap 934 between the inner surface of the coaxial tubular sleeve 920a and the outer surface of the resonator tube 910. The gap 934 may have a length 936 as measured from the center of the resonator slot 922 to the closer end of the coaxial sleeve 920a,b. It may be recognized that, due to the surface tension of the water against the two surfaces, the water in the gap 934 presents a high impedance acoustic path to the exterior of the resonator tube 910. Because the primary path for the pressure force of the water in the interior 932 of the resonator tube 910 is through the low acoustic impedance ends of the resonator tube 910, the water oscillation is primarily at the first resonant frequency of the resonator tube 910.

As depicted in FIG. 9B, the coaxial tubular sleeve 920b is configured to completely uncover the resonator slots 922. As a result, the resonator slots 922 present a direct and low impedance path to the water in the exterior of the resonator tube. Because the resonator slots 922 are located approximately at the interior nodes of the second resonant frequency of the resonator tube, the resonator tube emits sound waves at the second resonant frequency. It may be recognized that the motion of the coaxial tubular sleeve 920a,b relative to the resonator slots 922 will result in a change in the length 936 of the gaps 934. Without being bound by theory, it may be recognized that the motion of the coaxial tubular sleeve 920a,b will therefore change the acoustic impedance coupling through the gap 934 due to the change in the length 936 of the gap 934. This impedance coupling will be at a maximum in configuration 905a, in which the resonator slots 922 and slotted portion 921 are completely covered. This impedance coupling will be at a minimum in configuration 905b, in which the resonator slots 922 and slotted portion 921 are completely uncovered.

Finite element analysis simulations have been calculated to determine the output of an organ-pipe sound source substantially as disclosed above in FIGS. 2, 3A, 3B, 5A, and 5B. For the purposes of the simulations, Table 1 displays the organ pipe configuration used in the calculations.

TABLE 1

| Organ Pipe Component | Metric | Value |
| --- | --- | --- |
| Resonator Tube: | Overall length | 52.5" |
| | Medial portion length | 21.3" |
| | Terminal portion length (Both Identical) | 15.6" |
| | Inner diameter (All Portions) | 8.00" |
| | Outer diameter (Terminal Portions) | 8.94" |
| | Outer diameter (Medial Portion) | 8.7" |
| | Slot number (Radially Symmetric) | 3 |
| | Resonator slot Width | 2.00" |
| | Bridge number (Radially symmetric) | 3 |
| | Bridge width | 1.56" |
| Coaxial Sleeves | Overall length | 9.25" |
| | Inner diameter | 9.04' |
| | Outer diameter | 10.00' |
| Tube/Sleeve | Tube/Sleeve gap (At medial portion) | 0.12" |

It should be understood that while the specific results of the simulations may reflect the dimensions used in the calculations (see Table 1), the analysis of the simulation results may be generalized to an organ-pipe sound source having any one or more alternative dimensions as disclosed above.

FIG. 10 depicts the finite element analysis (FEA) mesh used to calculate the sound pressure output of an organ-pipe sound source having dimensions disclosed in Table 1 above. Because the organ-pipe sound source is axially symmetric, a two-dimensional axially symmetric simulation was run. As indicated in FIG. 10, the center of the organ-pipe sound source (corresponding to x/y coordinates 0/0) is equally offset from each of the two ends of the resonator tube and located along the central longitudinal axis of the resonator tube. The X and Y axes are labeled in meters from the center of the sound source. The simulations were run in steps corresponding to positions of the coaxial sleeves as the coaxial sleeves were slidably moved from a position completely covering the resonator slots to a position completely uncovering the resonator slots. Initially, each coaxial sleeve was positioned so that the longitudinal center of the coaxial sleeve was positioned directly over the respective center of the slotted portion. Each sleeve was then slidably moved to a respective terminal end of the resonator tube in increments of 2 cm. The sleeves were moved symmetrically during the simulation.

FIGS. 11A and 11B depict results of FEA simulations for an organ-pipe sound source having the resonator slots completely covered by the coaxial sleeves (FIG. 11A) and for an organ-pipe sound source having the resonator slots completely uncovered by the coaxial sleeves (FIG. 11B). The sound pressure level (SPL) in dB re I uPa is shown in FIG. 11A at an initial frequency of about 500 Hz, when the resonator slots were completely closed, and in FIG. 11B at a final frequency, when the resonator slots were completely opened. Initially, when the resonator slots were covered by the coaxial sleeves, the pipe operated as a half wavelength resonator at about 500 Hz, and radiated sound though through the open terminal ends. As the resonator slots are uncovered, the sound source operates like a four element array and radiates sound from the terminal ends as well as through the opening resonator slots. The transition from fully covered state to the fully uncovered state is smooth without a sudden change in frequency response. The directionality pattern also remains approximately 90 degrees in the horizontal direction in all frequency ranges. FIG. 12 depicts another graph of the absolute pressure (Pa) contours generated by the FEA simulation for the resonator tube having the resonator slots completely uncovered (frequency at about 1063 Hz).

The resonator slots are symmetrically located at a distance of about ⅓ from the resonator tube edges, where the second harmonic of the resonator tube has internal nodes. According to the simulation, the motion of the coaxial sleeves with respect to the resonator slots should have a minor effect on the second harmonic frequency. Additionally, the resonance frequency of the first harmonic can be moved toward the resonance frequency of the second harmonic. This behavior is depicted in FIG. 13 which is set of frequency responses of the sound system for shifts of the coaxial sleeves. In these simulations, the sleeve length was 9.5" (24 cm), and was shifted from a first configuration (slotted portions completely covered as depicted in FIG. 9A) to a second configuration (slotted portions completely uncovered as depicted in FIG. 9B). The frequency responses were calculated for a symmetric shift of 1 cm for the two coaxial tubes. It may be observed that the first resonance (first harmonic) changes from about 500 Hz to about 1050 Hz, while the second resonance (second harmonic) changes from about 1250 Hz to about 1400 Hz, which corresponds to only about a 12% change Between the resonance peaks, the pressure level amplitude drops more then 10 times (−20 dB). Without being bound by theory, the change in the first harmonic resonant frequency may be due to a change in the acoustic coupling between the water in the interior of the pipe and the exterior via the water in the gaps. As disclosed above with reference to FIGS. 9A,B, as the length of the gap decreases, the acoustic impedance coupling therethrough decreases.

Thus, the simulation indicates that the tunable organ-pipe sound system can potentially create a broadband frequency domain between two resonances corresponding to the first harmonic and the second harmonic. This approach has been described in U.S. Pat. No. 4,855,964 to B. L. Fanning and G. W. McMahon and entitled "Vented-Pipe Projector."

Experimental work was initiated to expand the frequency band of an organ-pipe sound source at the high frequency end of the range. Measurements were made of the acoustic output of a test instrument having substantially the same dimensions as those disclosed above in Table 1. FIGS. 14A-J are amplitude versus frequency measurements of the acoustic output of the test device as the coaxial sleeves are synchronously and symmetrically moved in 2 cm increments from an initial configuration of the resonator slots being completely covered (center of the coaxial sleeve initially located over the center of the resonator slot).

Figure 14A:
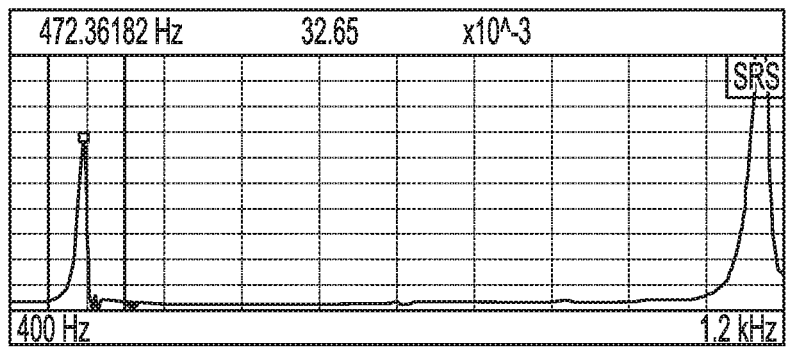
Figure 14B:
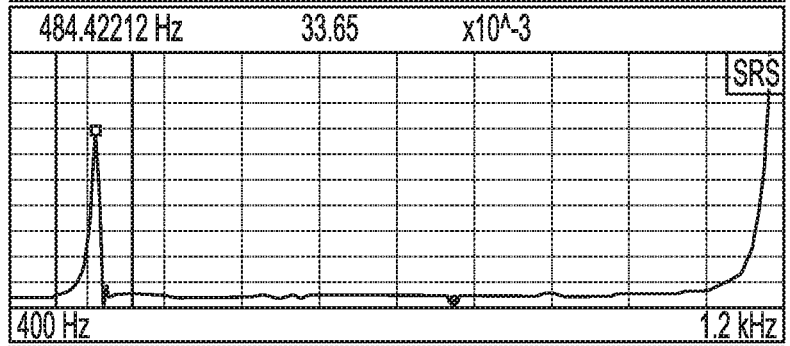
Figure 14C:
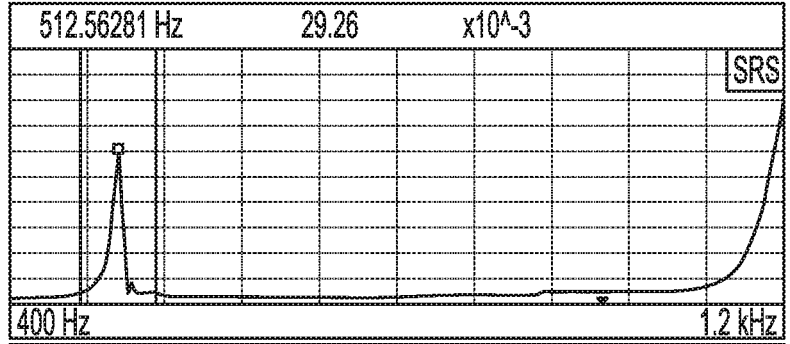
Figure 14D:
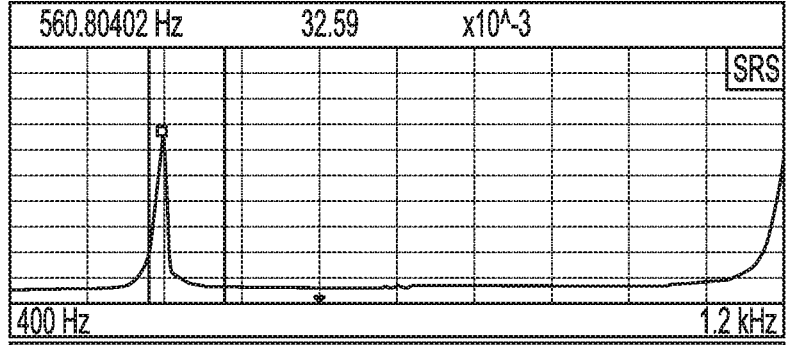
Figure 14E:
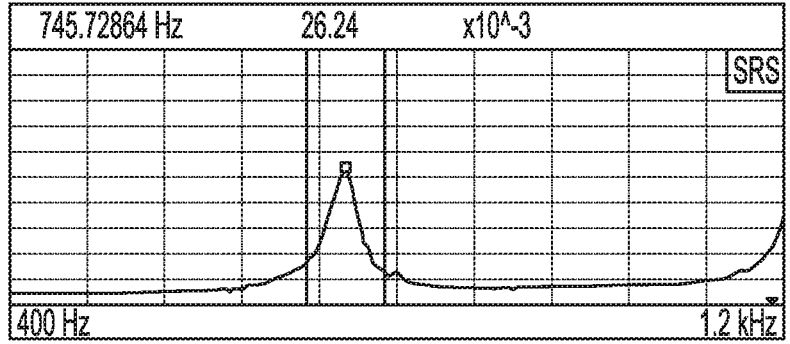
Figures 14F, 14G, 14H, 14I, 14J:
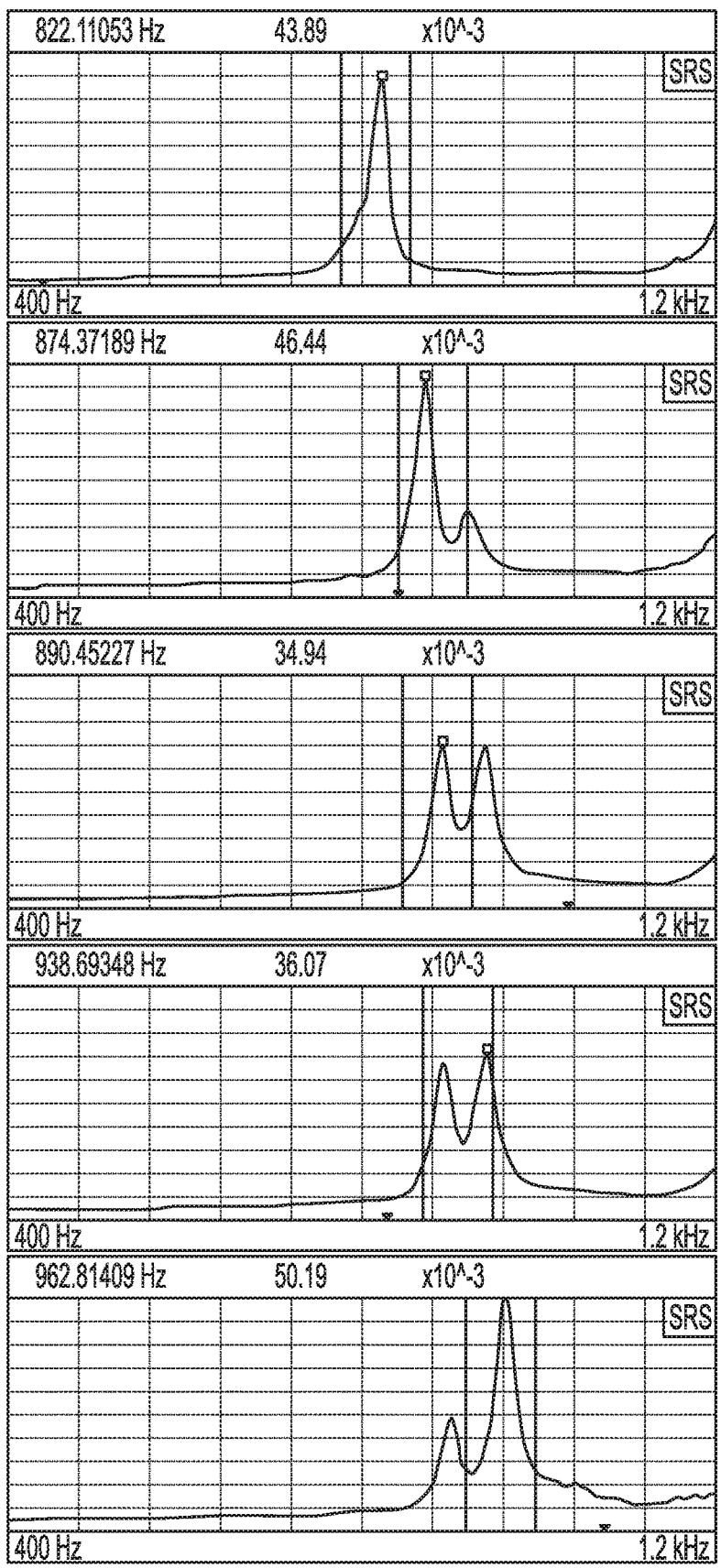

It may be observed that the frequency of the first harmonic resonance increases as the coaxial sleeves are moved, in a manner similar to that depicted in FIG. 13 (simulation values). However, a second resonance begins to appear when the first harmonic resonance frequency reaches a value of about 874.37189 Hz (FIG. 14G). The dual resonance depicted in FIG. 14G occurs after each of the coaxial sleeves is displaced 12 cm. If the center of the coaxial sleeves (total length 9.25 in. or about 23.5 cm) are located initially at the center of the resonator slots (width about 2 in. or about 5 cm), then the second resonance peak is observed when the edge of the coaxial sleeves have uncovered about 2.75 cm of the resonator slot. This result is surprising and unexpected in view of the simulations depicted in FIG. 13, in which no dual-resonant first harmonic peaks are observed. In reference to FIGS. 14G-14J, it is observed that the second peak of the dual-resonant feature does not correspond to a frequency associated with a second harmonic mode as disclosed in B. L. Fanning and G. W. McMahon. The dual-resonance acoustic emission depicted in FIGS. 14G-J appears related to the width of the resonator slots and the amount of the resonator slots uncovered by the coaxial sleeves. For example, if the resonator slot width is much larger that the width along the tube axis and the resonator slots are opened widely (for example, more than 2"), then the multiple resonances appear. In one aspect, for example, the width of the resonator slot may be fashioned to be about ½ of a radius of the inner diameter of the resonator tube.

An additional difference between the experimental results in FIGS. 14A-J and the simulation results in FIG. 13 is a clear indication of a shift in the second harmonic resonance to higher values. In the initial configuration of the system (FIG. 14A), the peak of the second harmonic is clearly visible at the right side of the graph. However, as the coaxial sleeves are moved relative to the resonator slots, (in the progression of FIGS. 14A-14F) the peak of the second harmonic moves to higher frequencies until only a small portion of the tail of the peak is observed at FIG. 14F. This behavior is surprising because it is not predicted by the simulations as depicted in FIG. 13. Similarly, this behavior was not anticipated by B. L. Fanning and G. W. McMahon who suggested that the first harmonic frequency peak could be adjusted to being arbitrarily close to the second harmonic frequency peak.

Without being bound by theory, an explanation for the multiple resonance peaks associate with the first harmonic may be considered as follows. When the coaxial sleeves are positioned to cover at least a major portion of the resonator slots having a wide width (that is, around 2 inches or wider), the resonator tube acts as a single resonator in which the two terminal portions and the medial portion of the resonator tube are strongly acoustically coupled. However, once the coaxial sleeves are positioned to uncover more than half of the resonator slots, the coupling among the three tube portions (two terminal portions and the medial portion) weakens considerably, and the portions begin to act as individual resonators. It may be suggested that the present simulation did not predict this effect because the present simulation only considered acoustic coupling through the water, including the water in the resonator tube interior and the gaps, and did not include acoustic coupling among the tube the portions via the metal bridges.

Again, without being bound by theory, it is believed that the two first harmonic resonance peaks depicted in FIGS. 14G-J are due to independent resonances of the medial portion and the two terminal portions. In an example in which the two terminal portions have equal tube lengths, and the length of the medial portion differs from that of the two terminal portions, the first harmonic resonance may be split into two resonance peaks. The difference in the frequencies may be related to the relative differences of the lengths of the tube portions. It may be suggested that three first harmonic resonance peaks may be produced by an organ-pipe sound source if the tube portions—that is, a first terminal portion, the medial portion, and a second terminal portion—do not have a common tube length.

Additionally, the frequencies at the first harmonic may also be dependent on the relative thickness of the tubes comprising the portions. For example, any one or more of the portions of the resonator tube may have a wall thickness about ⅛th of a radius of the inner diameter of the resonator tube. Additional adjustments to the multiple frequencies at the first harmonic may also be obtained by fabricating the resonator tube portions with different tube thicknesses. It may be recognized that the multiple first harmonic frequencies may be adjusted close to each other with very small amplitude variability over the working frequency band.

The results depicted above with respect to FIGS. 14A-J suggest a simple way to manufacture a tunable sound source with a broadband output that may be defined by a frequency response of the resonator tube at the high frequency end of the range. While the organ-pipe sound source disclosed above may produce dual resonances of the first harmonic, the same approach can be used to fabricate a broadband triple or greater resonance sound source.

Figure 15B:
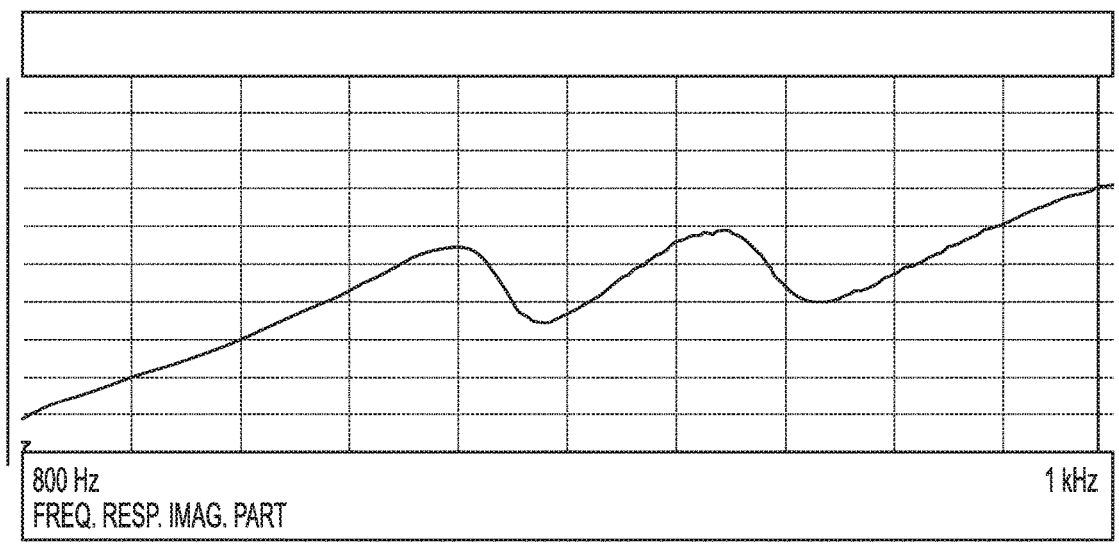

FIGS. 15A and 15B depict the real and imaginary components, respectfully, of the admittance of a tunable organ-pipe sound source as disclosed above in which the resonator slots of the slotted portions are completely uncovered by the coaxial sleeves. A tunable organ-pipe sound source in this configuration may therefore act as a broadband sound source having an output defined by the frequency response of the resonator tube. As depicted fin FIG. 15A, the frequency response of the resonator tube may be composed of a dual resonance transfer function defined by a first resonance frequency and a second resonance frequency. It can be observed that the output of the sound source in this configuration has the dual resonance frequencies (1505 and 1510) both having about the same amplitude. In the example depicted in FIG. 15A, the higher frequency resonance peak 1505 has a frequency of about 940 Hz and the lower frequency resonance peak 1510 has a frequency of about 890 Hz. The two resonances may be disposed between the first harmonic (at about 500 Hz) and the second harmonic (at about 1500 Hz) of the resonant tube. The first resonance peak 1505 and the second resonance peak 1510 may define a communication bandwidth 1530 for transmitting one or more information-containing signals underwater. As a non-limiting example, a communication bandwidth 1530 may be about 100 Hz and include frequencies between a lower limit 1525 of about 845 Hz and an upper limit 1520 of about 955 Hz 1520 and centered at a medial frequency 1515 of about 915 Hz. In some aspects, the medial frequency 1515 may be an average of the frequency of the first resonance peak 1505 and the frequency of the second resonance peak 1510. In general, the communication bandwidth 1530 may be chosen to have a frequency of about 10% to about 15% of the medial frequency 1515. In some non-limiting examples, the communication bandwidth may have a frequency of about 10% of the medial frequency 1515, of about 11% of the medial frequency 1515, of about 12% of the medial frequency 1515, of about 13% of the medial frequency 1515, of about 14% of the medial frequency 1515, of about 15% of the medial frequency 1515, or any such percentage or range of percentages therebetween including endpoints. This bandwidth may be sufficient for a long range underwater communication system for a precise underwater positioning support.

FIG. 15B depicts the imaginary or phase-related components of the tunable organ-pipe sound source as disclosed above in which the resonator slots of the slotted portions are completely uncovered by the coaxial sleeves. It may be noted that over the range of frequencies measured, little phase variability is observed at the frequencies corresponding to the two resonance peaks (1505 and 1510) corresponding to the characteristic resonance frequencies of the organ-pipe operating in the broadband mode.

It may be understood that a broadband organ-pipe sound source may be composed solely of the resonant tube, acoustical driver, and acoustical driver controller as disclosed above. Such a device may operate in a single signal transmission mode that sources arbitrary acoustic signals within the broad range of the bandwidth.

A second, tunable organ-pipe sound source may be composed of the broadband organ-pipe sound source disposed within the coaxial tubular sleeves. Such a device may operate in two signal transmission modes. When operated in a first mode, the slotted portions may be covered by the coaxial tubular sleeves which may be slid along the exterior surface of the resonant tube to select a resonant output frequency. The controller of the acoustical driver may control the frequency output of the acoustical driver to match the resonant output frequency determined by the position of the coaxial tubular sleeves. In this first mode, the tunable organ-pipe sound source may be programmed to transmit single frequency pulses, frequency modulated pulses, chirps, or linear swept-frequency signals. Such signals may be useful for underwater tomographic measurements. When operated in the second signal transmission mode, the coaxial tubular sleeves may be fixed at a position to uncover the slots in the slotted portions of the resonant tube. In this configuration, the tunable organ-pipe sound source may function like the broadband organ-pipe sound source disclosed above.

Reference throughout the specification to "various embodiments," "some embodiments," "one embodiment," "an embodiment", "one aspect," "an aspect" or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures or characteristics may be combined in any suitable manner in one or more aspects. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

While various details have been set forth in the foregoing description, it will be appreciated that the various aspects of the present disclosure may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for various aspects, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various embodiments are described in the following numbered examples:

EXAMPLE 1

An underwater sound source comprising:
an acoustical driver;
a controller of the acoustical driver; and
a resonator tube acoustically coupled to the acoustical driver, wherein the resonator tube further comprises:
  a first slotted portion comprising a first at least two co-radial resonator slots; and
  a second slotted portion comprising a second at least two co-radial resonator slots,
wherein a total length of the resonator tube defines a plurality of harmonics of the resonator tube,
wherein the first slotted portion is located at a first position along the total length of the resonator tube corresponding to a first node of one of the plurality of harmonics,
wherein the second slotted portion is located at a second position along the total length of the resonator tube corresponding to a second node of one of the plurality of harmonics, and
an output signal of the underwater sound source to within a bandwidth defined by a frequency response of the resonator tube.

EXAMPLE 2

The underwater sound source of Example 1, wherein the resonator tube has an outer diameter within a range of one tenth of the total length of the resonator tube to one half of the total length of the resonator tube.

EXAMPLE 3

The underwater sound source of any one or more of Example 1 through Example 2, wherein each of the first at least two co-radial resonator slots of the first slotted portion has a width within a range of one tenth of a radius of the resonator tube and one half of the radius of the resonator tube, and
  wherein each of the second at least two co-radial resonator slots of the second slotted portion has a width within a range of one tenth of the radius of the resonator tube and one half of the radius of the resonator tube.

EXAMPLE 4

The underwater sound source of any one or more of Example 1 through Example 3, wherein the first slotted portion and the second slotted portion define a medial section of the resonator tube therebetween,
  wherein the first slotted portion and a first end of the resonator tube define a first terminal section of the resonator tube therebetween, and
  wherein the second slotted portion and a second end of the resonator tube define a second terminal section of the resonator tube therebetween.

EXAMPLE 5

The underwater sound source of Example 4, wherein the first terminal section has a first section length the second terminal section has a second section length, and the medial section has a medial section length, and wherein the medial section length differs from the first section length and the medial section length differs from the second length.

EXAMPLE 6

The underwater sound source of any one or more of Example 4 through Example 5, wherein the first of the at least two co-radial resonator slots of the first slotted portion are separated by a first bridge connecting a first end of the medial section and a first end of the first terminal section, and
  wherein the second of the at least two co-radial resonator slots of the second slotted portion are separated by a second bridge connecting a second end of the medial section and a first end of the second terminal section.

EXAMPLE 7

The underwater sound source of any one or more of Example 1 through Example 6, wherein the frequency response of the resonator tube comprises a dual resonance transfer function defined by a first resonance frequency and a second resonance frequency, and the bandwidth is between 10% and 15% of a medial frequency defined as an average of the first resonance frequency and the second resonance frequency.

EXAMPLE 8

An underwater sound source comprising:
an acoustical driver;
a controller of the acoustical driver;
a resonator tube acoustically coupled to the acoustical driver, wherein the resonator tube further comprises:
  a first slotted portion comprising a first at least two co-radial resonator slots; and
  a second slotted portion comprising a second at least two co-radial resonator slots,
  wherein a total length of the resonator tube defines a plurality of harmonics of the resonator tube,
  wherein the first slotted portion is located at a position along the total length of the resonator tube corresponding to a first node of one of the plurality of harmonics,
  wherein the second slotted portion is located at a position along the total length of the resonator tube corresponding to a second node of one of the plurality of harmonics; and
a first coaxial tubular sleeve and a second coaxial tubular sleeve,
  wherein the resonator tube is disposed within the first coaxial tubular sleeve thereby forming a first gap between a first portion of an exterior surface of the resonator tube and an interior surface of the first coaxial tubular sleeve,
  wherein the resonator tube is disposed within the second coaxial tubular sleeve thereby forming a second gap between a second portion of the exterior surface of the resonator tube and an interior surface of the second coaxial tubular sleeve, and
  wherein the first coaxial tubular sleeve is configured to slide upon the first portion of the exterior surface of the resonator tube and the second coaxial tubular sleeve is configured to slide upon the second portion of the exterior surface of the resonator tube, wherein the underwater sound source is configured to operate in a first acoustic mode when the first slotted portion is covered by the first coaxial tubular sleeve and the second slotted portion is covered by the second coaxial tubular sleeve, and wherein the underwater sound source is configured to operate in a second acoustic mode when the first slotted portion is uncovered by the first coaxial tubular sleeve and the second slotted portion is uncovered by the second coaxial tubular sleeve.

EXAMPLE 9

The underwater sound source of Example 8, wherein the first gap has a width in a range between 1 mm and 5 mm, and the second gap has a width in a range between 1 mm and 5 mm.

EXAMPLE 10

The underwater sound source of any one or more of Example 8 through Example 9, wherein the controller of the acoustical driver is configured to control an output frequency of the acoustical driver to a tube resonance frequency determined at least in part by a location of the first coaxial tubular sleeve and a location of the second coaxial tubular sleeve when the underwater sound source is configured to operate in the first acoustic mode.

EXAMPLE 11

The underwater sound source of any one or more of Example 8 through Example 10, wherein the controller of the acoustical driver is configured to control an output signal of the underwater sound source to within a bandwidth defined by a a frequency response of the resonator tube.

EXAMPLE 12

An underwater sound system, comprising:
an underwater sound source, comprising:
  an acoustical driver;
  a controller of the acoustical driver;
  a resonator tube acoustically coupled to the acoustical driver, wherein the resonator tube further comprises:
    a first slotted portion comprising a first at least two co-radial resonator slots; and
    a second slotted portion comprising a second at least two co-radial resonator slots,
    wherein a total length of the resonator tube defines a plurality of harmonics of the resonator tube,
    wherein the first slotted portion is located at a position along the total length of the resonator tube corresponding to a first node of one of the plurality of harmonics,
    wherein the second slotted portion is located at a position along the total length of the resonator tube corresponding to a second node of one of the plurality of harmonics; and
  a first coaxial tubular sleeve and a second coaxial tubular sleeve,
    wherein the resonator tube is disposed within the first coaxial tubular sleeve thereby forming a first gap between a first portion of an exterior surface of the resonator tube and an interior surface of the first coaxial tubular sleeve,
    wherein the resonator tube is disposed within the second coaxial tubular sleeve thereby forming a second gap between a second portion of the exterior surface of the resonator tube and an interior surface of the second coaxial tubular sleeve, and
    wherein the first coaxial tubular sleeve is configured to slide upon the first portion of the exterior surface of the resonator tube and the second coaxial tubular sleeve is configured to slide upon the second portion of the exterior surface of the resonator tube,
  wherein the underwater sound source is configured to operate in a first acoustic mode when the first slotted portion is covered by the first coaxial tubular sleeve and the second slotted portion is covered by the second coaxial tubular sleeve, and
  wherein the underwater sound source is configured to operate in a second acoustic mode when the first slotted portion is uncovered by the first coaxial tubular sleeve and the second slotted portion is uncovered by the second coaxial tubular sleeve;
a transmission comprising a lead screw in mechanical communication with the first coaxial tubular sleeve and the second coaxial tubular sleeve;
a motor in mechanical communication with the transmission and configured to impart a rotary motion to the lead screw, thereby moving the first coaxial tubular sleeve and the second coaxial tubular sleeve; and
a water pressure housing, wherein an exterior surface of the water pressure housing is in mechanical communication with the transmission and the motor, and wherein an interior of the water pressure housing is configured to contain one or more electrical components configured to control and power the motor.

EXAMPLE 13

The underwater sound system of Example 12, wherein the lead screw is configured to move the first coaxial tubular sleeve and the second coaxial tubular sleeve symmetrically in opposing directions when the lead screw is rotated by the motor.

EXAMPLE 14

The underwater sound system of any one or more of Example 12 through Example 13, wherein the transmission is covered with one or more oil-filled bellows configured to prevent water from contacting the transmission.

EXAMPLE 15

A method of transmitting signals underwater, comprising:
providing an underwater sound source, comprising:
  an acoustical driver;
  a controller of the acoustical driver; and
  a resonator tube acoustically coupled to the acoustical driver, wherein the resonator tube further comprises:
    a first slotted portion comprising a first at least two co-radial resonator slots; and
    a second slotted portion comprising a second at least two co-radial resonator slots,
    wherein a total length of the resonator tube defines a plurality of harmonics of the resonator tube,
    wherein the first slotted portion is located at a first position along the total length of the resonator tube corresponding to a first node of one of the plurality of harmonics, and wherein the second slotted portion is located at a second position along the total length of the resonator tube corresponding to a second node of one of the plurality of harmonics; and controlling, by the controller, an output signal of the underwater sound source to within a bandwidth defined by a frequency response of the resonator tube.

What is claimed is:

1. An underwater sound source comprising:
an acoustical driver;
a controller of the acoustical driver;
a submersible resonator tube acoustically coupled to the acoustical driver, the submersible resonator configured to be immersed in a liquid medium, wherein the resonator tube further comprises:
  an interior portion configured to receive a portion of the liquid medium;
  a first slotted portion comprising a first at least two co-radial resonator slots; and
  a second slotted portion comprising a second at least two co-radial resonator slots,
wherein a total length of the resonator tube defines a plurality of harmonics of the resonator tube,
wherein the first slotted portion is located at a first position along the total length of the resonator tube corresponding to a first node of one of the plurality of harmonics,
wherein the second slotted portion is located at a second position along the total length of the resonator tube corresponding to a second node of one of the plurality of harmonics, and
wherein the controller of the acoustical driver is configured to control an output signal of the underwater sound source to within a bandwidth defined by a frequency response of the resonator tube; and
a first coaxial tubular sleeve and a second coaxial tubular sleeve,
wherein a first portion of an exterior surface of the resonator tube is disposed within the first coaxial tubular sleeve and a second portion of the exterior surface of the resonator tube is disposed within the second coaxial tubular sleeve,
wherein the first tubular sleeve and the second tubular sleeve are positioned to uncover the first slotted portion and the second slotted portion, and
wherein the resonator tube has a broadband frequency response defined by a first resonance frequency and a second resonance frequency, and a broadband frequency bandwidth that comprises frequencies between 10% and 15% of a medial frequency, defined as an average of the first resonance frequency and the second resonance frequency, including the first resonance frequency and the second resonance frequency.

2. The underwater sound source of claim 1, wherein the resonator tube has an outer diameter within a range of one tenth of the total length of the resonator tube to one half of the total length of the resonator tube.

3. The underwater sound source of claim 1, wherein each of the first at least two co-radial resonator slots of the first slotted portion has a width within a range of one tenth of a radius of the resonator tube and one half of the radius of the resonator tube, and wherein each of the second at least two co-radial resonator slots of the second slotted portion has a width within a range of one tenth of the radius of the resonator tube and one half of the radius of the resonator tube.

4. The underwater sound source of claim 1, wherein the first slotted portion and the second slotted portion define a medial section of the resonator tube therebetween,
wherein the first slotted portion and a first end of the resonator tube define a first terminal section of the resonator tube therebetween, and
wherein the second slotted portion and a second end of the resonator tube define a second terminal section of the resonator tube therebetween.

5. The underwater sound source of claim 4, wherein the first terminal section has a first section length the second terminal section has a second section length, and the medial section has a medial section length, and wherein the medial section length differs from the first section length and the medial section length differs from the second length.

6. The underwater sound source of claim 4, wherein the first at least two co-radial resonator slots of the first slotted portion are separated by a first bridge connecting a first end of the medial section and a first end of the first terminal section, and
wherein the first at least two co-radial resonator slots of the second slotted portion are separated by a second bridge connecting a second end of the medial section and a first end of the second terminal section.

7. An underwater sound source comprising:
an acoustical driver;
a controller of the acoustical driver;
a submersible resonator tube acoustically coupled to the acoustical driver, the submersible resonator configured to be immersed in a liquid medium, wherein the resonator tube further comprises:
  an interior portion configured to receive a portion of the liquid medium;
  a first slotted portion comprising a first at least two co-radial resonator slots; and
  a second slotted portion comprising a second at least two co-radial resonator slots,
wherein a total length of the resonator tube defines a plurality of harmonics of the resonator tube,
wherein the first slotted portion is located at a position along the total length of the resonator tube corresponding to a first node of one of the plurality of harmonics,
wherein the second slotted portion is located at a position along the total length of the resonator tube corresponding to a second node of one of the plurality of harmonics; and
a first coaxial tubular sleeve and a second coaxial tubular sleeve,
wherein the resonator tube is disposed within the first coaxial tubular sleeve thereby forming a first gap between a first portion of an exterior surface of the resonator tube and an interior surface of the first coaxial tubular sleeve,
wherein the resonator tube is disposed within the second coaxial tubular sleeve thereby forming a second gap between a second portion of the exterior surface of the resonator tube and an interior surface of the second coaxial tubular sleeve, and
wherein the first coaxial tubular sleeve is configured to slide upon the first portion of the exterior surface of the resonator tube and the second coaxial tubular sleeve is configured to slide upon the second portion of the exterior surface of the resonator tube,
wherein the underwater sound source is configured to operate in a first acoustic mode when the first slotted portion is uncovered by the first coaxial tubular sleeve and the second slotted portion is uncovered by the second coaxial tubular sleeve,
   wherein the resonator tube in the first acoustic mode has a broadband frequency response defined by a first resonance frequency and a second resonance frequency, and a broadband frequency bandwidth that comprises frequencies between 10% and 15% of a medial frequency, defined as an average of the first resonance frequency and the second resonance frequency, including the first resonance frequency and the second resonance frequency and
   wherein the underwater sound source is configured to operate in a second acoustic mode when the first slotted portion is at least partially covered by the first coaxial tubular sleeve and the second slotted portion is at least partially covered by the second coaxial tubular sleeve,
      wherein the resonator tube in the second configuration has a resonant frequency response in which a value of the first resonant frequency changes in response to an amount that the first coaxial tubular sleeve covers the first slotted portion and an amount that the second coaxial tubular sleeve covers the second slotted portion.

8. The underwater sound source of claim 7, wherein the first gap has a width in a range between 1 mm and 5 mm, and the second gap has a width in a range between 1 mm and 5 mm.

9. The underwater sound source of claim 7, wherein the controller of the acoustical driver is configured to control an output frequency of the acoustical driver to a tube resonance frequency determined at least in part by a location of the first coaxial tubular sleeve and a location of the second coaxial tubular sleeve when the underwater sound source is configured to operate in the first acoustic mode.

10. The underwater sound source of claim 7, wherein the controller of the acoustical driver is configured to control an output signal of the underwater sound source to within a bandwidth defined by a frequency response of the resonator tube.

11. The underwater sound source of claim 7, wherein the first resonant frequency comprises a dual resonance having a first component and a second component when the first coaxial tubular sleeve covers about one-half of a width of the first at least two co-radial resonator slots and the second coaxial tubular sleeve covers about one-half of a width of the second at least two co-radial resonator slots.

12. The underwater sound source of claim 11, wherein a first peak of the dual resonance corresponds to a first harmonic mode of the resonator tube and a second peak does not correspond to a second harmonic mode of the resonator tube.

13. The underwater sound source of claim 12, wherein an amplitude of the first peak of the dual resonance and an amplitude of the second peak of the dual resonance are dependent on an amount that the first coaxial tubular sleeve covers the first at least two co-radial resonator slots and an amount that the second coaxial tubular sleeve covers the second at least two co-radial resonator slots.

14. A method of transmitting signals underwater, comprising:
   providing an underwater sound source, comprising:
      an acoustical driver;
      a controller of the acoustical driver; and
      a submersible resonator tube acoustically coupled to the acoustical driver, the submersible resonator configured to be immersed in a liquid medium, wherein the resonator tube further comprises:
         an interior portion configured to receive a portion of the liquid medium;
         a first slotted portion comprising a first at least two co-radial resonator slots; and
         a second slotted portion comprising a second at least two co-radial resonator slots,
      wherein a total length of the resonator tube defines a plurality of harmonics of the resonator tube, and
      a first coaxial tubular sleeve and a second coaxial tubular sleeve,
      wherein a first portion of an exterior surface of the resonator tube is disposed within the first coaxial tubular sleeve and a second portion of the exterior surface of the resonator tube is disposed within the second coaxial tubular sleeve,
      wherein the first tubular sleeve and the second tubular sleeve are positioned to uncover the first slotted portion and the second slotted portion, respectively, and
      wherein the resonator tube has a broadband frequency response defined by a first resonance frequency and a second resonance frequency, and a broadband frequency bandwidth that comprises frequencies between 10% and 15% of a medial frequency, defined as an average of the first resonance frequency and the second resonance frequency, including the first resonance frequency and the second resonance frequency; and
   producing, by the acoustic driver, an acoustic output having a frequency within the broadband frequency bandwidth.

* * * * *